(12) United States Patent
Zhang et al.

(10) Patent No.: US 11,941,301 B2
(45) Date of Patent: Mar. 26, 2024

(54) MAINTAINING ONLINE ACCESS TO DATA STORED IN A PLURALITY OF STORAGE DEVICES DURING A HARDWARE UPGRADE

(71) Applicant: EMC IP Holding Company LLC, Hopkinton, MA (US)

(72) Inventors: Min Zhang, Shanghai (CN); Haohan Zhang, Shanghai (CN); Yang Liu, Shanghai (CN); Jianhuang Li, Shanghai (CN); Wai C. Yim, Merrimack, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 344 days.

(21) Appl. No.: 17/155,328

(22) Filed: Jan. 22, 2021

(65) Prior Publication Data

US 2022/0236884 A1 Jul. 28, 2022

(51) Int. Cl.
*G06F 3/06* (2006.01)
(52) U.S. Cl.
CPC ............ *G06F 3/067* (2013.01); *G06F 3/0604* (2013.01); *G06F 3/0644* (2013.01)
(58) Field of Classification Search
None
See application file for complete search history.

(56) References Cited

U.S. PATENT DOCUMENTS

| | | | |
|---|---|---|---|
| 8,433,777 B1 * | 4/2013 | Liu ..................... | G06F 11/2221 709/219 |
| 8,621,059 B1 | 12/2013 | Kong et al. | |
| 8,943,266 B2 | 1/2015 | Koseki | |
| 9,250,823 B1 * | 2/2016 | Kamat ................... | G06F 3/0607 |
| 9,940,280 B1 * | 4/2018 | O'Brien ................ | G06F 13/382 |
| 10,067,831 B2 | 9/2018 | Gladwin et al. | |
| 11,327,653 B2 * | 5/2022 | Yokoi ................. | G06F 12/0238 |

(Continued)

OTHER PUBLICATIONS

Serverfault, Moving RAID 1 disks between servers, Apr. 2012, https://serverfault.com/questions/383341/moving-raid-1-disks-between-servers (Year: 2012).*

(Continued)

*Primary Examiner* — Prasith Thammavong
*Assistant Examiner* — Edmund H Kwong
(74) *Attorney, Agent, or Firm* — BainwoodHuang

(57) ABSTRACT

A technique maintains online access to data stored in a plurality of storage devices during a hardware upgrade in which the plurality of storage devices moves between storage processor enclosures. The technique involves providing, from the plurality of storage devices, online access to the data while each storage device of the plurality of storage devices resides in a first storage processor enclosure. The technique further involves providing, from the plurality of storage devices, online access to the data while the plurality of storage devices is moved from the first storage processor enclosure to a second storage processor enclosure (e.g., transferring each storage devices one by one before triggering a rebuild process). The technique further involves providing, from the plurality of storage devices, online access to the data while each storage device of the plurality of storage devices resides in the second storage processor enclosure.

23 Claims, 12 Drawing Sheets

(56) References Cited

U.S. PATENT DOCUMENTS

| | | | | |
|---|---|---|---|---|
| 2007/0294476 | A1* | 12/2007 | Corn | G06F 3/0607 |
| | | | | 711/114 |
| 2016/0072883 | A1* | 3/2016 | Long | G06F 11/00 |
| | | | | 709/219 |
| 2016/0371206 | A1* | 12/2016 | Maung | G06F 13/20 |
| 2018/0314666 | A1* | 11/2018 | Tanaka | G06F 13/1668 |
| 2019/0220365 | A1* | 7/2019 | Mallela | G06F 11/1456 |
| 2020/0117556 | A1* | 4/2020 | Zou | G06F 11/2082 |
| 2021/0342280 | A1* | 11/2021 | McDaniel | G06F 13/20 |

OTHER PUBLICATIONS

Synology Community, Upgrading NAS—Can I just move drives from one to another?, Oct. 2019, https://community.synology.com/enu/forum/1/post/128954 (Year: 2019).*

* cited by examiner

MAINTAINING ONLINE ACCESS TO DATA STORED IN A PLURALITY OF STORAGE DEVICES DURING A HARDWARE UPGRADE

BACKGROUND

A typical data storage system performs write and read operations to store data within and load data from storage drives on behalf of one or more external host computers. Such a data storage system may include a chassis, a midplane disposed within the chassis, a pair of storage processors SP_A, SP_B that engage the midplane by plugging into storage processor slots through one end of the chassis, and storage drives that engage the midplane by plugging into storage drive slots through the opposite end of the chassis. The data storage system may further include other components that interface with the midplane such as input/output (I/O) modules, fans, power converters, and so on.

A conventional approach to upgrading hardware of the data storage system involves replacing certain components while the data storage system remains online (i.e., while the data storage system continues to perform write and read operations on behalf of the one or more external host computers). For example, to upgrade the original storage processors SP_A, SP_B with new storage processors SP_A+, SP_B+, a technician may replace the original storage processor SP_B with a new storage processor SP_B+ while the storage processor SP_A continues to perform write and read operations. Next, the technician may replace the original storage processor SP_A with a new storage processor SP_A+ while the storage processor SP_B+ continues to perform write and read operations.

SUMMARY

Unfortunately, there are deficiencies with the above-described conventional approach to upgrading hardware while the data storage system remains online. For example, the above-described conventional approach is not suitable for upgrading certain portions of the data storage system such as the original chassis or the original midplane. Accordingly, any new hardware (e.g., new storage processors SP_A+, SP_B+) that serves as an upgrade to original hardware must properly fit within the original chassis and engage the original midplane. As a result, the new hardware is forced to retain certain physical features of the original hardware such as the same form factor(s), the same connector type(s) and location(s), the same pad/pin layout(s), etc. Additionally, the new hardware must abide by the same signaling and power requirements supported by the original midplane. Furthermore, such continued use of the original chassis and the original midplane imposes other constraints and/or restrictions such as the same heat dissipation limitations, the same capacitance and signal integrity limitations, the same limitations to the number of components that directly connect to the midplane, other midplane expansion limitations, and so on.

One alternative to the above-described conventional approach to upgrading hardware while the data storage system remains online is to migrate (or copy) all of the data from the original data storage system to an entirely new data storage system that has a new chassis, a new midplane, new storage drives, etc. and then run the new data storage system in place of the original data storage system. However, there are drawbacks to this alternative approach. Along these lines, since this alternative requires new storage drives, the cost of this alternative approach may be significant. Additionally, this alternative approach requires additional time to migrate the data from the original storage drives to the new storage devices. Furthermore, this alternative approach imposes extra complexity on host computers by requiring the host computers to then communicate with the new data storage system instead of the original data storage system, and so on.

In contrast to the above-identified conventional approach to upgrading hardware while the data storage system remains online and the above-identified alternative approach of migrating data to an entirely new data storage system having new storage drives, improved techniques are directed to maintaining online access to data stored in a plurality of storage devices during a hardware upgrade in which the plurality of storage devices is moved from an initial enclosure to a new enclosure. The new enclosure may have geometries and associated features that are significantly different from those of the initial enclosure thus freeing the new enclosure from constraints of the initial enclosure such as physical restrictions, signaling restrictions, power restrictions, and so on. Moreover, such techniques support an online data-in-place (DIP) upgrade (e.g., uninterrupted continuous access to data stored in the plurality of storage devices) thus alleviating the need to obtain new storage drives, copy the data, reconfigure external host computers, and so on.

One embodiment is directed to a method of maintaining online access to data stored in a plurality of storage devices during a hardware upgrade. The method, which is performed within data storage equipment, includes providing, from the plurality of storage devices, online access to the data while each storage device of the plurality of storage devices resides in a first storage processor enclosure. The method further includes providing, from the plurality of storage devices, online access to the data while the plurality of storage devices is moved from the first storage processor enclosure to a second storage processor enclosure. The method further includes providing, from the plurality of storage devices, online access to the data while each storage device of the plurality of storage devices resides in the second storage processor enclosure.

Another embodiment is directed to data storage equipment which includes a first storage processor enclosure, a second storage processor enclosure, and electronic circuitry coupled with the first storage processor enclosure and the second storage processor enclosure. The electronic circuitry includes memory and control circuitry coupled with the memory. The memory stores instructions which, when carried out by the control circuitry, causes the control circuitry to perform a method of:

(A) providing, to a set of external host computers, access to data stored in a plurality of storage devices while each storage device of the plurality of storage devices resides in the first storage processor enclosure,
  (B) providing, to the set of external host computers, access to the data stored in the plurality of storage devices while the plurality of storage devices is moved from the first storage processor enclosure to the second storage processor enclosure, and
  (B) providing, to the set of external host computers, access to the data stored in the plurality of storage devices while each storage device of the plurality of storage devices resides in the second storage processor enclosure.

In some arrangements, first storage processing circuitry resides in the first storage processor enclosure and second storage processing circuitry resides in the second storage processor enclosure. Additionally, the method further includes, while each storage device of the plurality of storage devices resides in the first storage processor enclosure and while the first storage processing circuitry performs data storage operations accessing the data stored in the plurality of storage devices, establishing a data pathway between the first storage processing circuitry and the second storage processing circuitry.

In some arrangements, providing online access to the data while the plurality of storage devices is moved from the first storage processor enclosure to the second storage processor enclosure includes performing data storage operations accessing the data stored in the plurality of storage devices using the data pathway established between the first storage processing circuitry and the second storage processing circuitry while each storage device of the plurality of storage devices is transferred one at a time from a respective physical storage device slot of the first enclosure to a respective physical storage device slot of the second enclosure. When a data protection scheme such as RAID (Redundant Array of Independent Disks) Level 5 is used, such transfer of storage devices one at a time enables continued access to all data in the storage devices even when a storage device is temporarily removed.

In some arrangements, performing the data storage operations using the data pathway includes, from the first storage processing circuitry and in response to a set of host input/output (I/O) requests from a set of host computers, accessing (i) a first set of storage devices of the plurality of storage devices currently in the first storage processor enclosure and (ii) a second set of storage devices of the plurality of storage devices currently in the second storage processor enclosure through the data pathway.

In some arrangements, performing the data storage operations using the data pathway further includes, from the second storage processing circuitry and in response to another set of host I/O requests from the set of host computers, accessing (i) the first set of storage devices currently in the first storage processor enclosure through the data pathway and (ii) the second set of storage devices currently in the second storage processor enclosure.

In some arrangements, the first storage processing circuitry includes a first central processing unit (CPU) and a first backend switch, and the second storage processing circuitry includes a second CPU and a second backend switch. Additionally, a set of bus expansion cables extends between a service port of the first backend switch and a service port of the second backend switch. Furthermore, establishing the data pathway between the first storage processing circuitry and the second storage processing circuitry includes configuring the service port of the first backend switch as a downstream port that faces away from the first CPU from a perspective of the first backend switch and configuring the service port of the second backend switch as an upstream port that faces the first CPU from a perspective of the second backend switch.

In some arrangements, the second backend switch further includes a root port that connects to the second CPU and slot ports that connect to physical slots of the second storage processor enclosure. Additionally, establishing the data pathway between the first storage processing circuitry and the second storage processing circuitry further includes unbinding a set of logical links that currently link the root port of the second backend switch to the slot ports of the second backend switch, and binding a new set of logical links that newly link the service port of the second backend switch with the slot ports of the second backend switch.

In some arrangements, providing online access to the data while the plurality of storage devices is moved from the first storage processor enclosure to the second storage processor enclosure includes, within a predefined storage device failure time limit, losing communication with a particular storage device of the plurality of storage devices when the particular storage device is removed from the first storage processor enclosure and regaining communication with the particular storage device when the particular storage device is installed into the second storage processor enclosure to prevent initiation of a rebuild procedure configured to rebuild the particular storage device. Since the particular storage device is not out of communication for more than the predefined storage device failure time limit, initiation of the rebuild procedure is prevented.

In some arrangements, the first storage processing circuitry includes first enclosure storage processors, and the second storage processing circuitry includes second enclosure storage processors. Additionally, the method further includes disabling cache mirroring between the first enclosure storage processors and, after cache mirroring between the first enclosure storage processors is disabled, performing cache mirroring between a particular storage processor of the first enclosure storage processors and a particular storage processor of the second enclosure storage processors.

In some arrangements, a set of Ethernet cables extends between a local area network (LAN) port of the first storage processing circuitry and a LAN port of the second storage processing circuitry. Additionally, performing cache mirroring between the particular storage processor of the first enclosure storage processors and the particular storage processor of the second enclosure storage processors includes synchronizing a cache of the first storage processing circuitry with a cache of the second storage processing circuitry through the set of Ethernet cables.

In some arrangements, the method further includes, after the plurality of storage devices is moved from the first storage processor enclosure to the second storage processor enclosure, disabling cache mirroring between the particular storage processor of the first enclosure storage processors and the particular storage processor of the second enclosure storage processors and then performing cache mirroring between the second enclosure storage processors. Accordingly, all data storage operations may now be performed from the second storage processor enclosure.

In some arrangements, the plurality of storage devices includes a set of system drives and a set of regular drives. Additionally, providing online access to the data while the plurality of storage devices is moved from the first storage processor enclosure to the second storage processor enclosure includes performing data storage operations accessing the data stored in the plurality of storage devices in response to host input/output (I/O) requests from a set of host computers while the set of system drives is transferred one by one from the first storage processor enclosure to the second storage processor enclosure and subsequently the set of regular drives is transferred one by one from the first storage processor enclosure to the second storage processor enclosure. Accordingly, the set of system drives are transferred first followed by the set of regular drives.

In some arrangements, providing online access to the data while the plurality of storage devices is moved from the first storage processor enclosure to the second storage processor enclosure includes, in response to host input/output (I/O) requests from a set of host computers, operating storage processors of the first storage processing circuitry until all storage devices of the plurality of storage devices are moved from the first storage processor enclosure to the second storage processor enclosure.

In some arrangements, providing online access to the data while the plurality of storage devices is moved from the first storage processor enclosure to the second storage processor enclosure includes, in response to host input/output (I/O) requests from a set of host computers, concurrently operating a storage processor of the first storage processing circuitry and a storage processor of the second storage processing circuitry until all storage devices of the plurality of storage devices are moved from the first storage processor enclosure to the second storage processor enclosure.

In some arrangements, online access to the data stored in the plurality of storage devices is provided continuously during the method to enable a set of host computers to have uninterrupted online access to data-in-place within the plurality of storage devices. The data does not need to be migrated (or copied) to new storage devices.

In some arrangements, each of the first storage processor and the second storage processor configure Peripheral Component Interconnect Express (PCIe) switching circuitry to form storage paths between the first storage processor and the second storage processor.

In some arrangements, each of the first storage processor and the second storage processor apply the Serial Attached SCSI (SAS) protocol to complete data storage operations between the first storage processor and the second storage processor.

Yet another embodiment is directed to a method of upgrading data storage equipment. The method includes connecting first circuitry in a first storage processor enclosure to second circuitry in a second storage processor enclosure while the first circuitry provides online access to data stored within a plurality of storage devices installed within the first storage processor enclosure. The method further includes moving the plurality of storage devices from the first storage processor enclosure to the second storage processor enclosure while the first circuitry provides online access to the data stored within the plurality of storage devices. The method further includes, after the plurality of storage devices is moved from the first storage processor enclosure to the second storage processor enclosure, disconnecting the first circuitry in the first storage processor enclosure from the second circuitry in the second storage processor enclosure while the second circuitry provides online access to the data stored within the plurality of storage devices.

In some arrangements, moving the plurality of storage devices includes transferring each storage device of the plurality of storage devices one at a time from the first storage processor enclosure to the second storage processor enclosure such that at most one storage device of the plurality of storage devices is uninstalled while moving the plurality of storage devices from the first storage processor enclosure to the second storage processor enclosure.

In some arrangements, transferring each storage device of the plurality of storage devices one at a time includes moving each storage device of the plurality of storage devices one by one from a respective physical slot of the first storage processor enclosure to a respective physical slot of the second storage processor enclosure while, to a set of host computers, the first circuitry provides online access to the data stored within the plurality of storage devices and the second circuitry does not provide online access to the data stored within the plurality of storage devices.

In some arrangements, transferring each storage device of the plurality of storage devices one at a time includes moving each storage device of the plurality of storage devices one by one from a respective physical slot of the first storage processor enclosure to a respective physical slot of the second storage processor enclosure while, to a set of host computers, both the first circuitry and the second circuitry provide online access to the data stored within the plurality of storage devices.

It should be understood that, in the cloud context, at least some electronic circuitry (e.g., hosts, backup sites, etc.) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, componentry, computer program products, and so on. Some embodiments are directed to various methods, electronic components and circuitry which are involved in maintaining online access to data stored in a plurality of storage devices during a hardware upgrade.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to maintaining online access to data stored in a plurality of storage devices during a hardware upgrade in which the plurality of storage devices is moved from an initial enclosure to a new enclosure. The new enclosure may have geometries and associated features that are significantly different from those of the initial enclosure thus freeing the new enclosure from constraints of the initial enclosure such as physical restrictions, signaling restrictions, power restrictions, and so on. Moreover, such a technique supports an online data-in-place upgrade (e.g., uninterrupted continuous access to data stored in the plurality of storage devices) thus alleviating the need to obtain new storage drives, copy the data, reconfigure external host computers, and so on.

Figure 1:
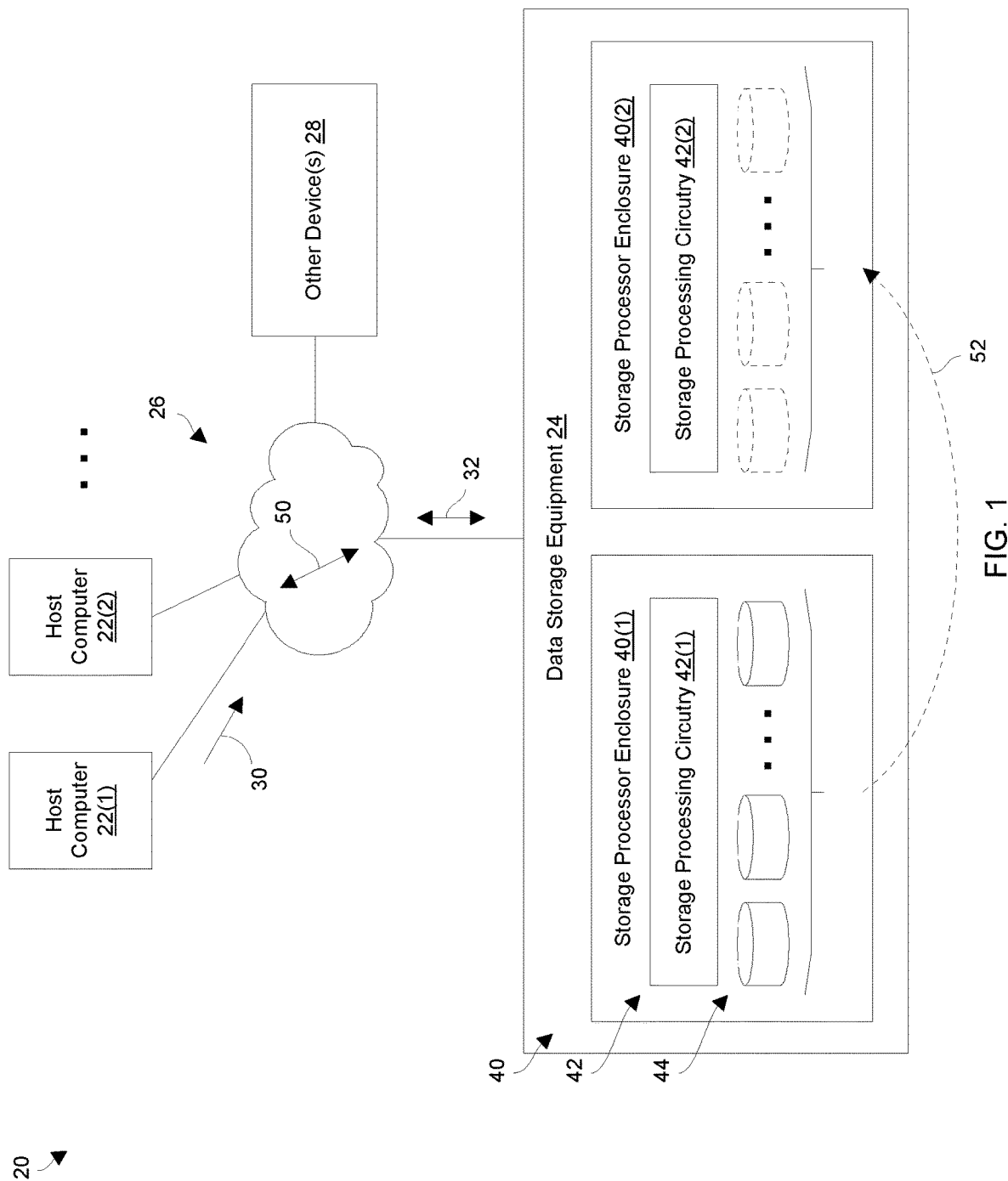
FIG. 1 is a block diagram of a data storage environment which maintains online access to data stored in a plurality of storage devices during a hardware upgrade in accordance with certain embodiments.

FIG. 1 shows a data storage environment 20 which maintains online access to data stored in a plurality of storage devices during a hardware upgrade in accordance with certain embodiments. The data storage environment 20 includes host computers 22(1), 22(2), . . . (collectively, host computers 22), data storage equipment 24, a communications medium 26, and perhaps other devices 28.

Each host computer 22 is constructed and arranged to perform useful work. For example, one or more of the host computers 22 may operate as a file server, a web server, an email server, an enterprise server, a database server, a transaction server, combinations thereof, etc. which provides host input/output (I/O) requests 30 to the data storage equipment 24. In this context, the host computers 22 may provide a variety of different I/O requests 30 (e.g., block and/or file based write commands, block and/or file based read commands, combinations thereof, etc.) that direct the data storage equipment 24 to store data 32 within and retrieve data 32 from storage (e.g., primary storage or main memory, secondary storage or non-volatile memory, tiered storage, combinations thereof, etc.).

The data storage equipment 24 includes storage processor enclosures 40(1), 40(2) (hereinafter storage processors enclosures 40), storage processing circuitry 42(1) disposed within the storage processor enclosure 40(1), storage processing circuitry 42(2) disposed within the storage processor enclosure 40(2), and a plurality of storage devices 44 initially disposed within the storage processor enclosure 40(1). The storage processing circuitry 42(1), 42(2) (collectively, storage processing circuitry 42) is constructed and arranged to respond to the host I/O requests 30 from the host computers 22 by writing data 32 into the plurality of storage devices 44 and reading the data 32 from the plurality of storage devices 44.

Further details of the storage processing circuitry 42 in accordance with certain embodiments will be provided shortly. However, it should be understood that various aspects of the storage processing circuitry 42(1) may be different from those of the storage processing circuitry 42(2) (e.g., physical geometries, thermal characteristics, electrical requirements/constraints, capacity/throughput, expansion/connection capabilities, combinations thereof, etc.).

The plurality of storage devices 44 provides non-volatile secondary storage, e.g., solid state drives (SSDs), magnetic hard disk drives (HDDs), combinations thereof, etc. Examples of suitable storage devices 44 include storage drives that use the Peripheral Component Interconnect Express (PCIe) interface (e.g., PCIe SSDs), Serial Attached SCSI/Non-Volatile Memory Express (SAS/NVMe) drives, and so on.

When storing data 32 within the plurality of storage devices 44, the storage processing circuitry 42 is capable of applying one or more data protection schemes to provide fault tolerance such as RAID5 which involves maintaining RAID extents (or Ubers) having multiple data portions and a parity portion distributed across multiple storage devices 44. As a result, if a data portion or a parity portion of a RAID extent is lost (e.g., due to a failure of a storage device 44), the information within the lost data portion or parity portion may be reconstructed thus providing high availability to the data 32.

It should be understood that RAID5 is provided by way of example as a suitable data protection scheme. Other data protection schemes are suitable for use as well such as RAID6, RAID10, and so on. Moreover, in accordance with certain embodiments, the data storage equipment 24 implements a mapped-RAID architecture.

Additionally, the storage processing circuitry 42 may provide other enhancements, optimizations, etc. For example, the storage processing circuitry 42 may provide a variety of specialized data storage services and features such as caching, cache mirroring, storage tiering, deduplication, compression, encryption, snapshotting, backup/archival services, replication to other data storage equipment, and so on.

It should be understood that the data 32 may include host data from the host computers 22. The data 32 may include other information as well such as data created from user-level applications running on the data storage equipment 24, data generated from processing the host data locally on the data storage equipment 24, snapshots of the host data, and so on. The data 32 may further include other types of data such as checksums and other types of error detection/data correction information, mapping data, block and/or file system metadata, deduplication data, compression data, versioning data, other data to support recovery, configuration information, and other types of metadata, combinations thereof, and so on, which is managed and maintained by the data storage equipment 24.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

The other devices 28 represent other possible componentry of the data storage environment 20. Along these lines, the other devices 28 may include management tools to remotely monitor and/or control operation of the data storage equipment 24. Additionally, the other devices 28 may include remote data storage equipment that provides data 32 to and/or receives data 32 from the data storage equipment 24

(e.g., replication arrays, backup and/or archiving equipment, service processors and/or management devices, etc.).

During operation, the storage processing circuitry 40 of the data storage equipment 24 performs data storage operations to richly and robustly provide online access to data 32 stored in the plurality of storage devices 44. In particular, at an early point in time, the data storage equipment 24 may include only the storage processor enclosure 40(1), the storage processing circuitry 42(1), and the plurality of storage devices 44.

At a later time, the operator of the data storage equipment 24 may decide to upgrade some of the initial hardware such as the storage processor enclosure 40(1) and the storage processing circuitry 42(1), but not upgrade the plurality of storage devices 44. Moreover, the operator may wish to continue to provide online access to the data 32 stored in the plurality of storage devices 44 during the upgrade.

In accordance with certain embodiments, to accommodate this situation, the operator performs a hardware upgrade procedure which provides uninterrupted online access to data-in-place (DIP) within the plurality of storage devices 44. Such an upgrade procedure includes replacing the storage processor enclosure 40(1) and the storage processing circuitry 42(1) but alleviates the need to obtain new storage devices 44, copy the data to the new storage devices 44, reconfigure external host computers, and so on.

At the beginning of the hardware upgrade procedure, the operator adds the storage processor enclosure 40(2) and the storage processing circuitry 42(2) as new equipment. The operator then electronically connects the storage processing circuitry 40(1) residing in the storage processor enclosure 40(1) with the storage processing circuitry 40(2) residing in the storage processor enclosure 40(2). During this initial portion of the process, the data storage equipment 24 continues to provide online access to the data 32 stored in the plurality of storage devices 44 (e.g., the storage processing circuitry 42(1) performs data storage operations in response to host I/O requests 30 from the host computers 22).

Next, the operator moves the plurality of storage devices 44 one storage device 44 at a time from the storage processor enclosure 40(1) to the storage processor enclosure 40(2) (arrow 52). That is, the operator transfers the storage devices 44 one by one so that at most only one storage device 44 is disconnected from the enclosures 40 at any point in time. During this portion of the process, the data storage equipment 24 continues providing online access to the data 32 stored in the plurality of storage devices 44 (e.g., the storage processing circuitry 42(1) and/or the storage processing circuitry 42(2) performs data storage operations in response to host I/O requests 30 from the host computers 22).

It should be appreciated that while each storage device 44 is being individually transferred from the storage processor enclosure 40(1) to the storage processor enclosure 40(2), any data 32 on that storage device 44 may be reconstructed from other storage devices 44 if necessary. In some embodiments, the transfer of each storage device 44 is performed within a predefined storage device failure time limit (e.g., two minutes, five minutes, etc.) to prevent initiation of a rebuild procedure configured to rebuild that storage device 44.

After all of the storage device 44 have been moved from the initial storage processor enclosure 40(1) to the storage processor enclosure 40(2), the storage processing circuitry 42(2) may fully provide online access to the data 32 stored in the plurality of storage devices 44. Accordingly, the initial storage processor enclosure 40(1) and the initial storage processing circuitry 42(1) may be disconnected and removed. As a result, hardware of the data storage equipment 24 is now upgraded and online access to the data 32 stored in the plurality of storage devices 44 was continuously maintained.

It should be understood that each storage processor enclosure 40 is constructed and arranged to hold respective storage processing circuitry 42 and the plurality of storage devices 44. Such a storage processor enclosure 40 may be constructed and arranged to hold other componentry as well such as I/O modules, fans, power converters, etc. Some of this additional componentry may be moved to the new enclosure 40(2) as well (e.g., I/O modules).

It should be further understood that the data storage equipment 24 may include additional enclosures for other hardware. Along these lines, the additional enclosures may hold other storage devices, I/O modules, memory boards, and so on. In accordance with certain embodiments, the hardware upgrade procedure may include disconnecting all or some of the additional enclosures from the initial storage processor enclosure 40(1) and then connecting them to the new storage processor enclosure 40(2) while maintaining online access to the data 32 stored in the plurality of storage devices 44. Further details will now be provided with reference to FIG. 2.

Figure 2:
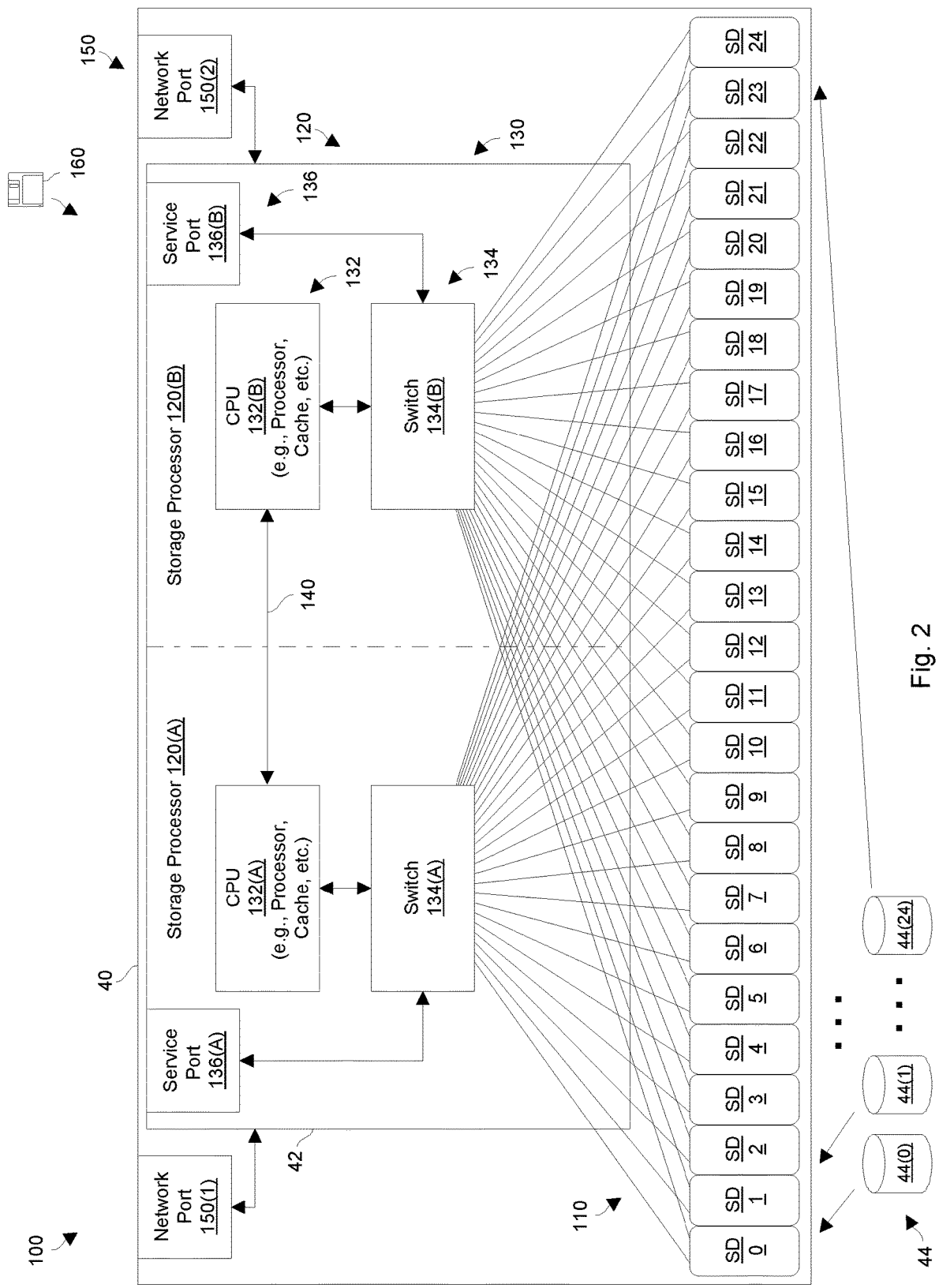
FIG. 2 is a schematic block diagram of electronic circuitry of the data storage environment in accordance with certain embodiments.

FIG. 2 shows an example apparatus 100 which is suitable for receiving the above-described hardware upgrade procedure. The example apparatus 100 includes a storage processor enclosure 40, storage processing circuitry 42, and a plurality of storage devices 44.

The storage processor enclosure 40 may take the form of a frame or similar support structure (e.g., a chassis, a housing, a card cage, combinations thereof, etc.) which supports and/or locates other hardware. The storage processor enclosure 40 differs from other enclosures such as drive enclosures that merely contain storage devices because the storage processor enclosure 40 is constructed and arranged to hold storage processing circuitry 42. In some arrangements, the storage processor enclosure 40 includes a midplane (e.g., a multilayered circuit board with traces, connectors, signal conditioning circuitry, etc.) and an outer framework to hold/attach various components to the midplane for connectivity.

For example, the framework may define a set of openings (or slots) on one side of the midplane to enable the storage processing circuitry 42 to connect with that side of the midplane, and another set of openings on the other side of the midplane to enable the plurality of storage devices 44 to connect with the other side of the midplane. The lines 110 in FIG. 2 illustrate electrical traces (or paths) provided by the midplane that lead to different storage device slots SD0, SD1, . . . , SD24 of the enclosure 40 for receiving respective storage devices 44(0), 44(1), . . . , 44(24).

By way of example, the enclosure 40 provides 25 storage device slots. However, it should be understood that the enclosure 40 may provide a different number of storage device slots (e.g., 16, 20, 24, 32, 36, 48, and so on).

Also, by way of example, the storage processing circuitry 42 includes two storage processors 120(A), 120(B) (collectively, storage processors 120). However, it should be understood that the storage processing circuitry 42 may include a different number of storage processors 120 (e.g., three, four, etc.).

As further shown in FIG. 2, each storage processor 120 includes various SP components 130 such as a central processing unit (CPU) 132, a switch 134, and a service port 136. That is, the storage processor 120(A) includes CPU 132(A), a switch 134(A), and a service port 136(A). Similarly, the storage processor 120(B) includes CPU 132(B), a switch 134(B), and a service port 136(B). In some arrangements, each storage processor 120 has multiple CPUs, and so on. The various SP components 130 may include other componentry such as connectors, power conditioning circuitry, memory, buffers, and so on.

The CPU 132 may take the form of a processor chipset and include other circuitry as well such as cache memory (e.g., an instruction cache, a read cache, a write cache, etc.). The switch 134 routes communications among different switch ports leading to various locations such as between the CPU 132 and the storage device slots. Accordingly, the CPU 132 is able to access the storage devices 44 through the switch 134 when the storage devices 44 are installed in their respective slots. The service port 136 serves as a dedicated interface through which the switch 134 may connect to external circuitry.

A cache mirroring interface (CMI) 140 is established between the CPUs 132 to enable cache mirroring between the storage processors 120. That is, each storage processor 120 is able to maintain a local copy of a cache of the other storage processor 120 via communications through the cache mirroring interface 140. Accordingly, when a first storage processor 120 is in operation (e.g., performing I/O stack operations that eventually access data in the plurality of storage devices 44), the second storage processor 120 within the enclosure 40 maintains a copy of the contents of the cache of the first storage processor 120, and vice versa, for fault tolerance.

Each storage processor 120 may include other components 130 as well such as user I/O components (e.g., lights, speakers, buttons, etc.), persistent memory for storing firmware, clock circuitry, and so on. Moreover, the enclosure 40 may include other components which are accessible by one or multiple storage processors 120 such as I/O modules (e.g., Ethernet interfaces), power supplies, fans, and so on. Along these lines, each storage processor 120 has access to a computer network (e.g., a local area network or LAN) through multiple network ports 150(1), 150(2) (collectively, network ports 150).

It should be understood that the storage processors 120 may access an operating system which is loaded into one or more of the storage devices 44. For example, the first four storage devices 44 that install into slots SD0, SD1, SD2, and SD3 may serve as system drives (or drives) that store an operating system, and the remaining storage devices 44 that install into the other slots SD4, . . . SD24 may serve as regular drives that do no store the operating system. In some arrangements, there are a different number of system drives such as one, two, three, five, etc. Additionally, in some arrangements, the system drives may store regular data in addition to the operating system.

It should be further understood that the operating system refers to particular control code such as a kernel to manage computerized resources (e.g., processor cycles, memory space, etc.), drivers (e.g., an I/O stack), configuration data, and so on. The CPU 132 of a storage processor 120 executing the operating system forms specialized circuitry that robustly and reliably manages the data 32 stored in the plurality of storage devices 44. Moreover, the specialized circuitry, perhaps collaborating with other circuitry, is able to maintain online access to the data 32 during a hardware upgrade in which the plurality of storage devices 44 is moved from an initial enclosure 40 to a new enclosure 40.

In accordance with certain embodiments, a computer program product 160 is capable of delivering all or portions of the operating system and perhaps other software constructs to the apparatus 100. In particular, the computer program product 160 has a non-transitory (or non-volatile) computer readable medium which stores a set of instructions that controls one or more operations of the apparatus 100. Examples of suitable computer readable storage media include tangible articles of manufacture and apparatus which store instructions in a non-volatile manner such as DVD, CD-ROM, flash memory, disk memory, tape memory, and the like. Further details will now be provided with reference to FIGS. 3 through 6.

FIGS. 3 through 6 show particular details for a first example of a hardware upgrade process in accordance with certain embodiments. It should be understood that particular components such as midplanes, power supplies, I/O modules, fans, etc. and/or their related complexities may be hidden or simplified for ease of explanation.

Figure 3:
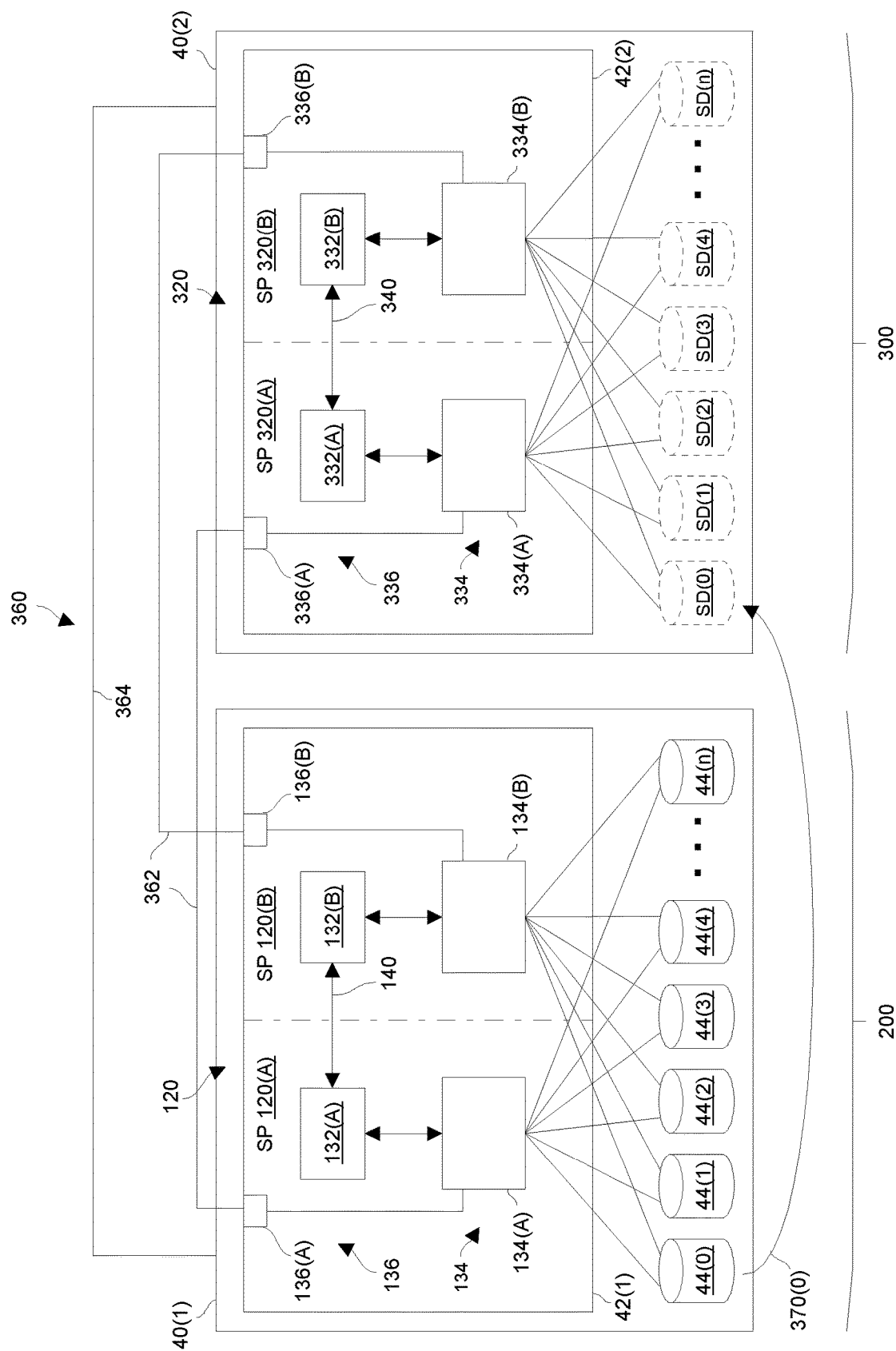
FIG. 3 is a block diagram illustrating particular details of a first upgrade example in accordance with certain embodiments.

With attention first to FIG. 3, suppose that initial data storage equipment 200 includes an initial storage processor enclosure 40(1) and storage processing circuitry 42(1). The storage processing circuitry 42(1) includes storage processors 120(A), 120(B) which are constructed and arranged to store data into and load data from a plurality of storage devices 44 (e.g., also see FIG. 2). By way of example, the storage processors 120(A), 120(B) store the data within the plurality of storage devices 44 using RAID5 as a data protection scheme. Accordingly, in the event that a storage device 44 fails (or a storage device 44 is removed), access to all of the data remains available (e.g., any lost data may be reconstructed from the remaining storage devices 44).

Additionally, the storage processors 120(A), 120(B) include caches which are mirrored through an interface 140. Accordingly, the initial data storage equipment 200 is capable of write back caching for low latency, cache mirroring and persisting for further fault tolerance and/or load balancing, etc.

Further suppose that the initial data storage equipment 200 has been in operation for some time (e.g., years) robustly and reliably performing data storage operations on behalf of a set of host computers 22 (e.g., also see FIG. 1), but that the operator wishes to replace the initial data storage equipment 200 with new data storage equipment 300. In particular, the operator wishes to continuously provide online access to the data stored in the plurality of storage devices 44 during the upgrade process.

As shown in FIG. 3, the new data storage equipment 300 includes a new storage processor enclosure 40(2) and storage processing circuitry 42(2). The storage processing circuitry 42(2) includes storage processors 320(A), 320(B) which are similarly constructed and arranged to store data into and load data from the plurality of storage devices 44 (e.g., also see FIG. 2). By way of example, the storage processors 320(A), 320(B) may be configured to access the data from the plurality of storage devices 44 using the same RAID5 data protection scheme. Additionally, the storage processors 320(A), 320(B) include caches which are mirrored through an interface 340 thus enabling write back caching for low latency, cache mirroring and persisting for further fault tolerance and/or load balancing, and so on.

One should appreciate that the initial data storage equipment 200 and the new data storage equipment 300 may have the same general layout from a schematic perspective. However, the enclosures 40, the midplanes, and/or other related componentry may significantly differ in other ways such as capacity, throughput, expandability, form factor, modularity, layout, energy efficiency, noise, vibration, electromagnetic interference, enhancements, quality, serviceability, combinations thereof, and so on. Accordingly, performing a hardware upgrade including these portions of equipment is extremely advantageous.

At the beginning of the upgrade process, the operator connects the new data storage equipment 300 to the initial data storage equipment 200 while the initial data storage equipment 200 continues to provide online access to the data stored in the plurality of storage devices 44. As part of this connection work, the operator may connect a set of cables 360 between the new data storage equipment 300 and the initial equipment 200. The set of cables 360 may include one or more storage cables 362 for carrying backend storage signals (e.g., also see the service ports 136 in FIG. 2), one or more network cables 364 for carrying network signals (e.g., also see the network ports 150 in FIG. 2), and perhaps other cables.

Along these lines, the new data storage equipment 300 and the initial data storage equipment 200 may be located proximate to each other (e.g., in the same equipment rack, in neighboring equipment racks, next to each other in separate equipment cabinets, etc.), and the operator attaches the set of cables 360 to the equipment 200, 300. Certain cabling aspects such as the type of cables, connectors, lengths, etc. may be determined by the type of ports, jacks, connectors, and/or protocols available (e.g., a SAS cable for SAS communications, a PCIe cable for PCIe communications, an Ethernet cable for Ethernet communications, etc.). Moreover, the pathways through the set of cables may include other devices (e.g., a chain/fabric of one or more other enclosures/switches/etc., a network of data communications devices, and so on).

With the set of cables 360 in place, a service port 136(A) of the storage processor 120(A) is now connected to a service port 336(A) of the storage processor 320(A). Similarly, a service port 136(B) of the storage processor 120(B) is now connected to a service port 336(B) of the storage processor 320(B). Moreover, the initial data storage equipment 200 and the new data storage equipment 300 are now connected for Ethernet communications.

Next, the operator prepares the storage equipment 200, 300 so that the plurality of storage devices 44 can be physically moved from the initial storage processor enclosure 40(1) to the new storage processor enclosure 40(2) one by one in a straight forward manner with no interruption in terms of online access to the data. Along these lines, the backed switches 134, 334 of the storage processors 120, 320 are configured to enable the storage processing circuitry 40(1) of the initial storage processing circuitry 42(1) to access the storage devices 44 once they are installed within respective slots of the new storage processor enclosure 40(2) (e.g., slots SD(0), . . . SD(n)). Further details of such configuration work will be provided below.

Additionally, suppose that the plurality of storage devices 44 includes a set of system drives (e.g., the storage devices 44(0), 44(1), 44(2), and 44(3)) that stores the operating system used by the storage equipment 200, 300 and a set of regular drives (e.g., storage devices 44(4), . . . , 44(n)) that do not store the operating system. In such a situation, prior to moving the storage devices 44, the operator may relocate any non-operating system data from the set of system drives to another storage area (e.g., to the set of regular drives, to storage in another enclosure, combinations thereof, etc.). Such relocating minimizes unnecessary loading and/or contention on the set of system drives.

Furthermore, the operator may perform other preparatory operations. Such operations include quiescing the storage processor 120(B) (i.e., completing any operations already started by the storage processor 120(B) and moving the storage processor 120(B) to an idle state) while the storage processor 120(A) continues to process data storage operations, converting cached metadata and synchronizing the caches, configuring the equipment 200, 300 to support system drive mirror synching and partition offset mapping, and so on.

At this point, the storage processor 120(A) continues to provide online access to the data and each storage device 44 of the plurality of storage devices 44 still resides in the initial storage processor enclosure 40(1). However, with the set of cables 360 now in place and the switches 134, 334 now configured to support storage device redirection to the slots SD(0), . . . SD(n) of the new storage processor enclosure 40(2), the operator switches to using one of the storage processors 320 of the enclosure 40(2) to operate as a peer of the storage processor 120(A) of the enclosure 40(1). Along these lines, the storage processor 320 of the storage processor enclosure 40(2) is able to access the data stored in the plurality of storage devices 44 (e.g., to run the operating system, etc.) regardless of whether the storage devices 44 are in the initial storage processor enclosure 40(1) or in the new storage processor enclosure 40(2).

In accordance with certain embodiments, the storage processor 120(A) synchronizes its local cache with that of one of the storage processors 320 through the set of cables 360 (e.g., one or more network cables 364). Such synchronization achieves cache mirroring between the storage processor 120(A) in the enclosure 40(1) and a storage processor 320 of the enclosure 40(2) such as the storage processor 320(B), e.g., the one or more network cables 364 operates as at least a portion of a cache mirroring interface (see FIG. 3).

Just before physical transfer of the storage devices 44 begins, all of the storage devices 44 (including the set of system drives) currently reside in the initial storage processor enclosure 40(1) and the storage processors 120, 320 execute the operating system from storage devices 44 within the initial storage processor enclosure 40(1). To this end, the storage processor 320 in the storage processor enclosure 40(1) that is configured to perform data storage operations has access to the same IO paths as that of the storage processor 120(A) in the enclosure 40(1).

The operator then transfers the storage devices 44 one at a time from the storage processor enclosure 40(1) to the storage processor enclosure 40(2) (e.g., see the arrow 370(0) in FIG. 3). That is, the operator removes a first storage device 44 from a first slot SD(0) of the storage processor enclosure 40(1) and installs the first storage device 44 into a corresponding first slot SD(0) of the storage processor enclosure 40(2), and so on (e.g., see slots SD(0), . . . SD(n) of the storage processor enclosure 40(2) in FIG. 3). Here, a storage processor 120, 320 in each storage processor enclosure 40(1), 40(2) serves IO.

It should be understood that the storage processors 120 (A), 320(A) continue to expect connectivity with all of the storage devices 44. Accordingly, if the storage processors 120(A), 320(A) determine that communication with a storage device 44 has been lost for more than a predefined rebuild threshold time (e.g., a storage device timeout), the storage processors 120(A), 320(A) may consider that storage device 44 to have failed and initiate a rebuild process to reconstruct data stored on that storage device 44.

To prevent the storage processors 120(A), 320(A) from initiating the rebuild process, the operator makes sure that the timing of each storage device move is within the predefined rebuild threshold time. In accordance with certain embodiments, prior to moving any storage devices 44, the operator transitions the storage processors 120(A), 320

(A) from a normal mode to a drive firmware upgrade reboot window mode to increase the amount of time that communications can be lost before a storage device 44 is considered failed (e.g., to temporarily extend the rebuild threshold time from less than a couple of minutes to five minutes). Such switching of modes provides additional time (e.g., flexibility) to the operator when transferring each storage device 44.

Figure 4:
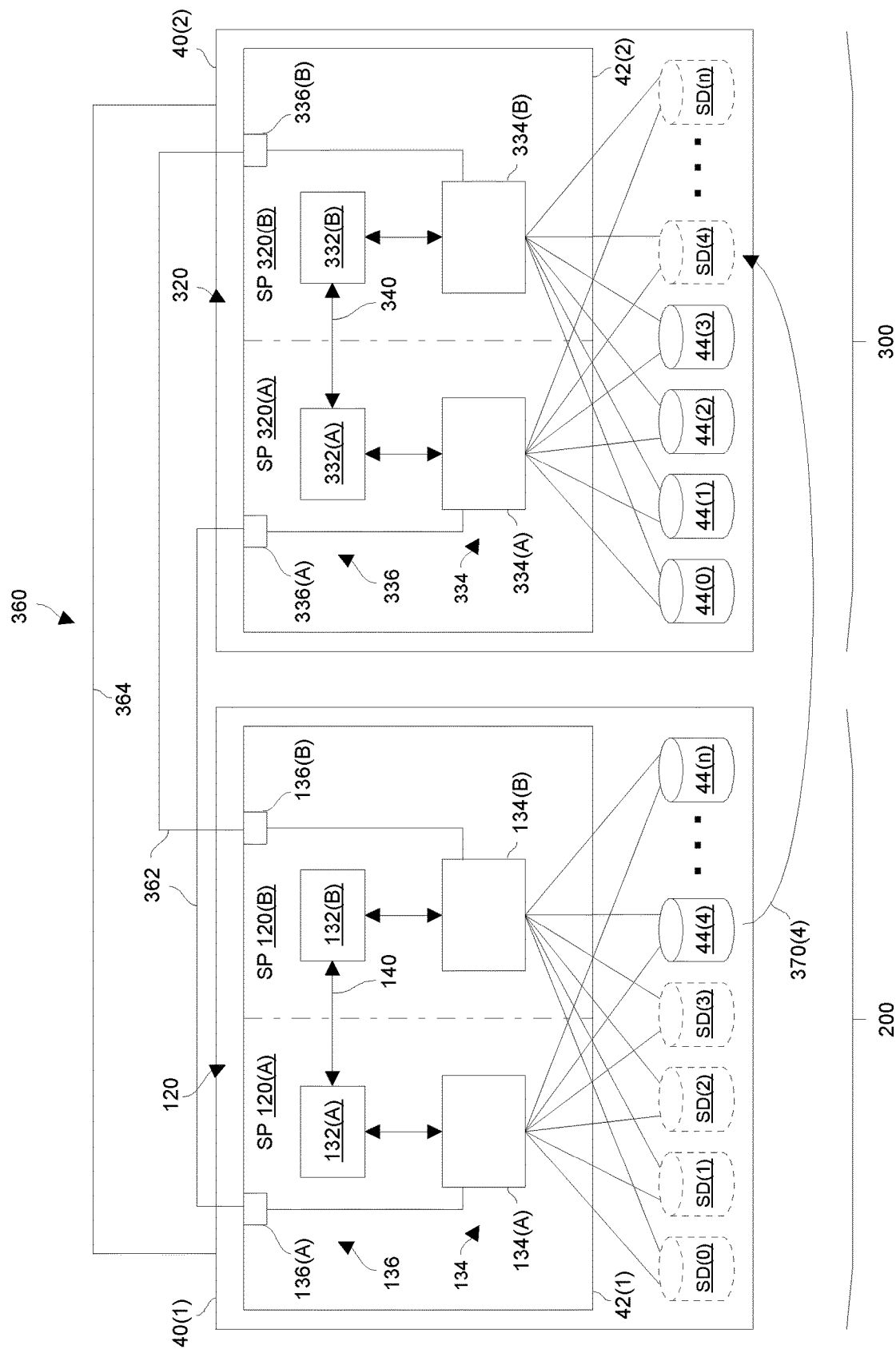
FIG. 4 is a block diagram illustrating additional details of the first upgrade example in accordance with certain embodiments.

FIG. 4 shows the initial data storage equipment 200 and new data storage equipment 300 while there is still online access provided to the data stored in the plurality of storage devices 44 and after some of the storage devices 44 have been transferred from the initial storage processor enclosure 40(1) to the new storage processor enclosure 40(2). In particular, the set of system drives (e.g., storage devices 44(0), 44(1), 44(2), and 44(3)) has been moved to the new storage processor enclosure 40(2). Accordingly, slots SD(0), SD(1), SD(2), and SD(3) of the initial storage processor enclosure 40(1) that used to hold the set of system drives are now empty.

After the set of system drives has been moved from the initial storage processor enclosure 40(1) to the new storage processor enclosure 40(2), transfer continues by transferring the set of regular drives (e.g., storage devices 44(4), . . . , 44(n)) from the initial storage processor enclosure 40(1) to the new storage processor enclosure 40(2) (see the arrow 370(4) in FIG. 4). It should be understood that since the set of system drives now resides in the new storage processor enclosure 40(2), the storage processors 120(A), 320(A) now execute the operating system from storage devices 44 within the new storage processor enclosure 40(2).

Figure 5:
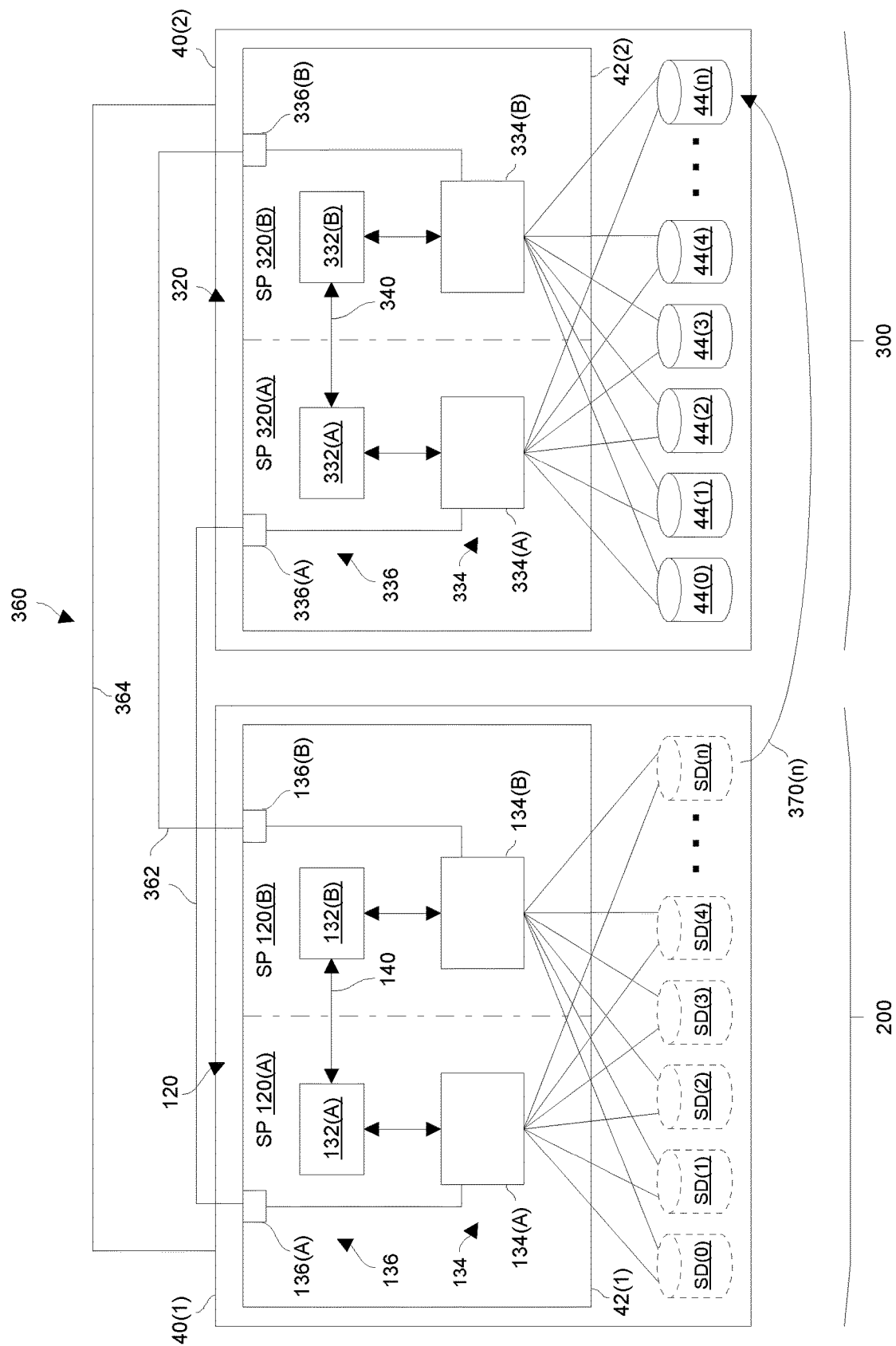
FIG. 5 is a block diagram illustrating further details of the first upgrade example in accordance with certain embodiments.

FIG. 5 shows the initial data storage equipment 200 and new data storage equipment 300 while there is still online access provided to the data stored in the plurality of storage devices 44 and after all of the storage devices 44 have been moved to the new storage processor enclosure 40(2). In particular, the last storage device 44 has been moved from the initial storage processor enclosure 40(1) to the new storage processor enclosure 40(2) (e.g., see the arrow 370(n)). Accordingly, all of the slots SD(0), . . . , SD(n) of the initial storage processor enclosure 40(1) that used to hold the plurality of storage devices 44 are now empty.

After the plurality of storage devices 44 has been moved from the initial storage processor enclosure 40(1) to the new storage processor enclosure 40(2), the operator quiesces the storage processor 120(A) while one of the storage processors 320 residing in the storage processor enclosure 40(2) continues to process data storage operations. The operator then enables operation of the other storage processor 320 residing in the storage processor enclosure 40(2) as a peer (e.g., with cache mirroring, load balancing, enabled failover, etc.). As a result, all data storage operations are now performed by the new data storage equipment 300.

With the new data storage equipment 300 now fully providing online access to the data stored in the plurality of storage devices 44, the operator may disconnect the initial data storage equipment 200 from the new data storage equipment 300. The operator may then remove the set of cables 360 and the initial data storage equipment 200.

As described above, the upgrade process effectively replaces initial data storage equipment 200 with new data storage equipment 300 while maintaining online access to data stored in a plurality of storage devices 44 during the upgrade. Such replacement includes certain components that are not replaced in a conventional upgrade of simply swapping hardware SPs and swappable modules. For example, the upgrade process effectively upgrades the initial storage processor enclosure 40(1) and the midplane residing within the initial storage processor enclosure 40(1).

It should be understood that the upgrade process was described above as simultaneously running a storage processor 120 from the initial enclosure 40(1) and a storage processor 320 from the new enclosure 40(2) while the storage devices 44 were transferred from the initial enclosure 40(1) to the new enclosure 40(2). In an alternative process and in accordance with certain embodiments, the switches 134, 334 of the storage processors 120, 320 are configured so that both storage processors 120(A), 120(B) of the initial storage processor enclosure 40(1) are able to access the slots in both enclosures 40(1), 40(2) while the while the storage devices 44 are transferred from the initial enclosure 40(1) to the new enclosure 40(2). Such an alternative process enables all data storage operations to be performed by the initial equipment 200 until all of the storage devices 44 have been transferred to the new enclosure 40(2) (i.e., the storage processors 320(A), 320(B) do not serve IO while the storage devices 44 are being moved).

In this alternative process, after all of the storage devices 44 are transferred to the new initial enclosure 40(2), data storage operations are transitioned from the storage processors 120(A), 120(B) to the storage processors 320(A), 320(B). Such transition of data storage operations is effectuated in a manner similar to that explained above just prior to moving the storage devices 44, e.g., by keeping one storage processor 120 active (or operational) while quiescing the other storage processor 120, activating one storage processor 320 as a peer to the operational storage processor 120, synchronizing caches, quiescing the storage processor 120 that was kept active, and activating the second storage processor 320.

Figure 6:
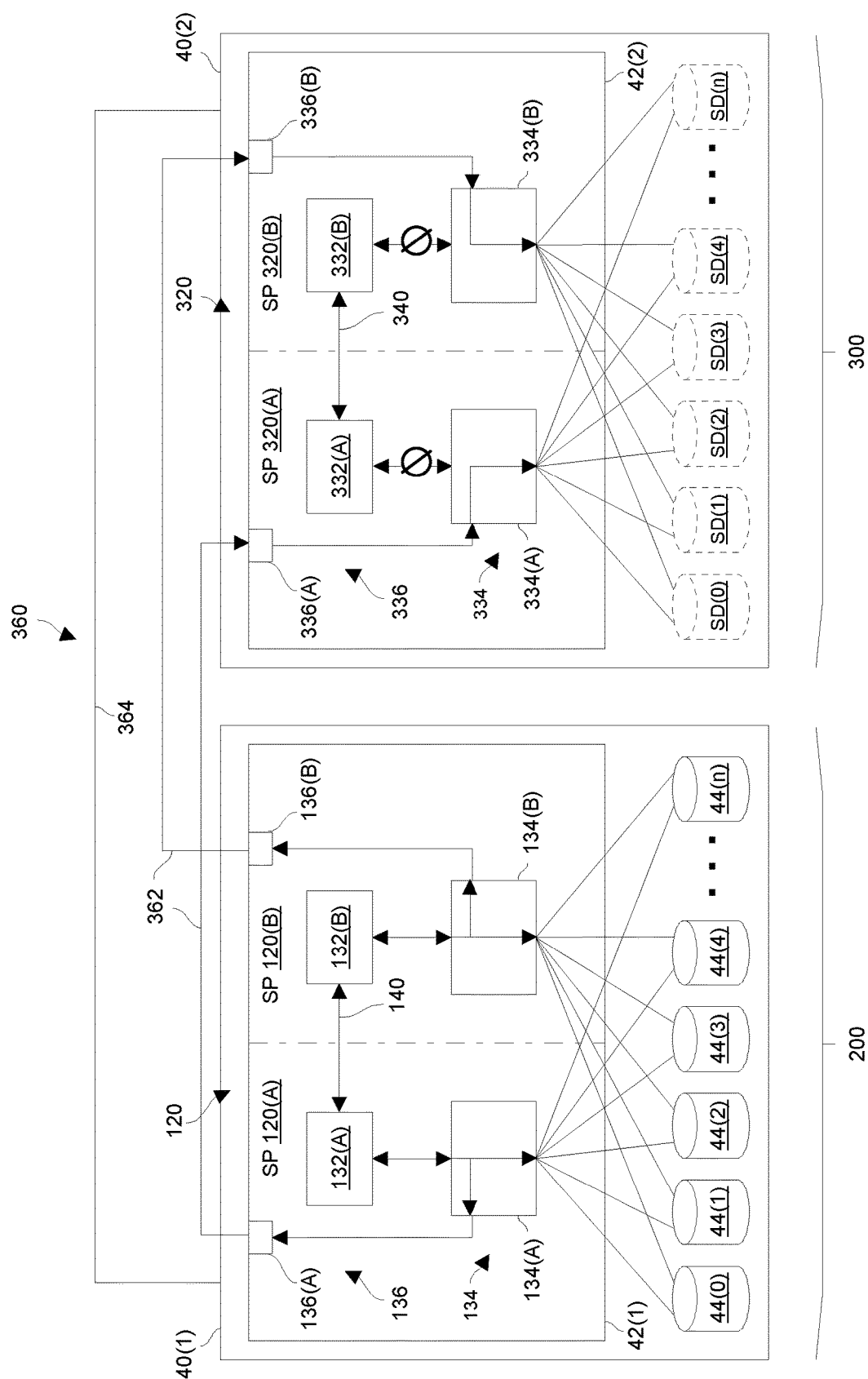
FIG. 6 is a block diagram illustrating more details of the first upgrade example in accordance with certain embodiments.

FIG. 6 shows how the switches 134, 334 of the storage processors 120, 320 may be configured to provide paths from the initial enclosure 40(1) to the new enclosure 40(2) in accordance with certain embodiments. By way of example, the switches 134, 334 are configurable PCIe switches (e.g., via an I2C bus) that enable binding (or linking) between logical and physical ports, as well as attribute assignments such as downstream (e.g., storage facing) and upstream (e.g., control facing) from the perspectives of the switches 134, 334.

Initially, the ports of the switches 134 leading to the CPUs 132 are assigned as upstream ports and other ports of the switches 134 leading to storage device slots are assigned as downstream ports. Additionally, the upstream port of each switch 134 is bound (or linked) to all of the downstream ports.

During the upgrade process, the switches 134, 334 are reconfigured to establish paths between the initial enclosure 40(1) and the new enclosure 40(2). FIG. 6 shows, by way of example, multiple pathways established from the initial enclosure 40(1) to the new enclosure 40(2). Such reconfiguration of the switches 134, 334 enables both storage processors 120 in the initial enclosure 40 to access the plurality of storage devices 44 regardless of storage device location.

To reconfigure the switch 134(A) of the storage processor 120(A), the attribute of the switch port leading to the service port 136(A) is changed from being an upstream port (control facing) to being a downstream port (storage facing). The result of this change is illustrated by the arrow extending from the switch 134(A) to the service port 136(A).

Additionally, a set of unbind operations are performed to remove links between the switch port leading from the switch 134(A) to the CPU 132(A) and the switch ports leading to the storage devices 44, and a set of bind operations are performed to form new links between the switch port leading from the switch 134(A) to the CPU 132(A) and the switch ports leading to the storage devices 44. The results of this change are illustrated by the arrows within the switch 134(A) extending from the CPU switch port to all of the other switch ports.

It should be understood that similar configurations are made to the switch 134(B) of the storage processor 120(B). Such configuration changes are illustrated by the arrows in storage processor 120(B).

Furthermore, as shown in FIG. 6, the switches 334 within the storage processors 320 are reconfigured. In particular, access by the CPUs 332 to the switches 334 is disabled. However, access from the service ports 336 to the switch ports leading to the storage device slots are enabled. Accordingly, the CPUs 132 of the storage processors 120 in the initial storage processor enclosure 40(1) can always see the storage devices 44 even when the storage devices 44 are moved from the initial enclosure 40(1) to the new enclosure 40(2).

It should be further understood that the above-described upgrade process can be applied to hardware upgrades involving storage processors 120 having multiple CPUs. Further details will now be provided with reference to FIG. 7 through 10.

FIGS. 7 through 10 show particular details for a second example of a hardware upgrade process in accordance with certain embodiments. It should be understood that particular components such as midplanes, power supplies, I/O modules, fans, etc. and/or their related complexities may be hidden or simplified for ease of explanation.

Moreover, it should be understood that certain upgrade details that applied to the first example (e.g., see FIGS. 3 through 5) may also apply to this second example and may not be further addressed in the discussion of this second example. Similarly, certain details that are provided for this second example may also apply to the first example.

Figure 7:
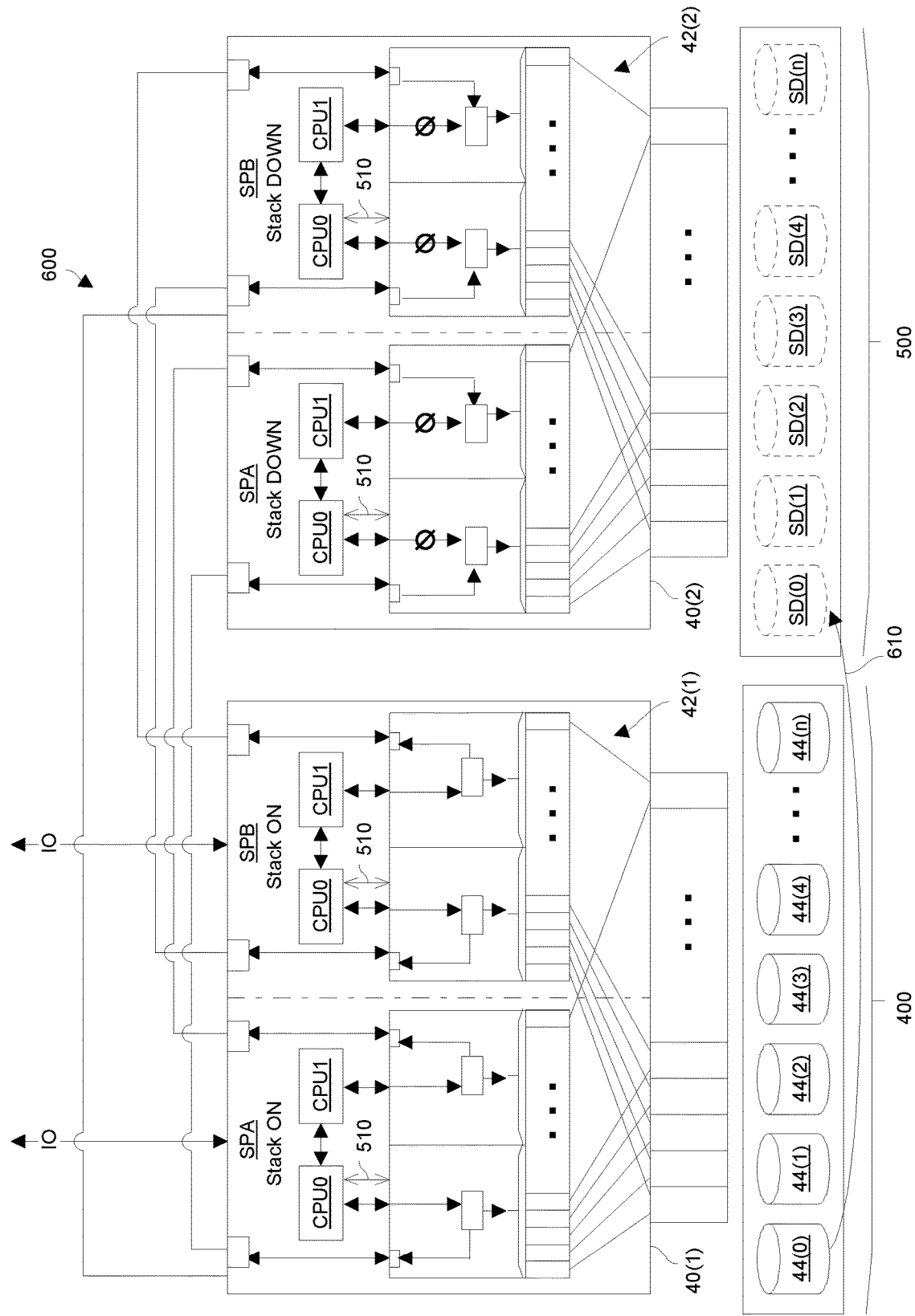
FIG. 7 is a block diagram illustrating particular details of a second upgrade example in accordance with certain embodiments.

With attention first to FIG. 7, there is initial data storage equipment 400 which includes an initial storage processor enclosure 40(1) and initial storage processing circuitry 42(1). The initial storage processing circuitry 42(1) includes two storage processors SPA, SPB (collectively, SPs) which are constructed and arranged to perform data storage operations that access a plurality of storage devices 44(0), . . . 44(*n*). Each SP of the initial storage processing circuitry 42(1) includes multiple processors, e.g., CPU0, CPU1.

In accordance with certain embodiments, an upgrade is performed which replaces the initial data storage equipment 400 with new data storage equipment 500 which includes a new storage processor enclosure 40(2) and new storage processing circuitry 42(2). Similarly, the new storage processing circuitry 42(2) includes two storage processors SPA, SPB which are constructed and arranged to perform data storage operations that access a plurality of storage devices 44(0), . . . 44(*n*). Likewise, each SP of the new storage processing circuitry 42(2) includes multiple processors, e.g., CPU0, CPU1. In some arrangements, there is a separate connection 510 (e.g., an I2C bus) between the CPU and switch that the CPU uses to restore switch configurations after SP failover (shown in FIG. 7 but omitted elsewhere for simplicity). The upgrade may improve particular aspects such as the midplane, form factors, capacities, expansion capabilities, and so on, as mentioned earlier.

As in the first example, the second example provides continuous online access to the data stored in the plurality of storage devices during the upgrade process. It should be appreciated that before the upgrade process begins, the initial data storage equipment 400 may have been performing data storage operations on behalf of a set of host computers (also see FIG. 1) for a period of time (e.g., years). This aspect of serving IOs is illustrated by the "IO" arrows indicating that input/output operations (IOs) are being performed by the SPs of the initial data storage equipment 400 (e.g., through a front end SLIC). In particular, each SP of the initial storage processing circuitry 42(1) operates a respective I/O stack (i.e., "Stack ON") to process read and write requests. That is, when an SP is in a "Stack ON" state as illustrated by label "Stack ON", the SP is powered on, the storage processor 120 is executing the operating system, and the software stack is online.

In contrast, both SPs of the new data storage equipment 500 are offline and thus do not operate to perform data storage operations. That is, each SP of the new data storage equipment 500 is not operating its I/O stack (i.e., "Stack DOWN"). In particular, when an SP is in a "Stack DOWN" state, the SP is powered on, the SP may be executing the operating system, but the software stack is down and, therefore, there currently is no "Stack ON" label for the SPs of the new data storage equipment 500 but instead they are labeled "Stack DOWN".

In an initial step to upgrade the initial data storage equipment 400, the operator connects the initial data storage equipment 400 and the new data storage equipment 500 via a set of cables 600. The set of cables 600 may include one or more storage cables (e.g., to chain enclosures) and one or more computer cables (e.g., for network communications), among others. In accordance with certain embodiments, the SPs of both the initial storage processing circuitry 42(1) and the new storage processing circuitry 42(2) have backend switches to enable data storage operations across enclosures (e.g., chaining). In some arrangements, the backend switches are PCIe multiple port switches that are configurable (e.g., for binding/unbinding links between ports, for changing flow attributes between downstream and upstream, and so on).

In accordance with certain embodiments, the service ports of the initial data storage equipment 400 are connected to the service ports of the new data storage equipment 500 (e.g., SPA to SPA and SPB to SPB via PCIe cables). Additionally, a service LAN port of the initial data storage equipment 400 connects to a service LAN port of the new data storage equipment 500 (e.g., the service LAN port of the old SPA connects to the service LAN port of the new SPB via an Ethernet cable) for sufficient bandwidth for cache synching.

After the operator has attached the set of cables 600 and as shown in FIG. 7, the equipment 400, 500 is appropriately configured to enable physical transfer of the plurality of storage devices 44 from the initial storage processor enclosure 40(1) to the new storage processor enclosure 40(2) while maintaining online access to the data store in the plurality of storage devices 44. Along these lines, various backend switches are controlled so that each SP of the initial data storage equipment 400 has access to the storage devices 44 regardless of whether the storage devices 44 reside in the initial storage processor enclosure 40(1) or in the new storage processor enclosure 40(2). Such configuring may be performed by a human operator, by an automated routine in response to a command, combinations thereof, etc.

In accordance with certain embodiments, in the initial storage processing circuitry 42(1), initial links between the upstream ports (i.e., the CPU root ports) and the downstream ports of the switches are unbound. Additionally, write caching is disabled in the initial storage processing circuitry 42(1).

Furthermore, both SPs of the initial data storage equipment 400 are in "Stack ON" states, and both SPs of the new data storage equipment 500 are in "Stack DOWN" states. Accordingly, only the initial data storage equipment 400 is servicing IO requests.

At this point, the operator physically moves the storage devices 44 one at a time from slots of the initial storage processor enclosure 40(1) to slots of the new storage processor enclosure 40(2). In particular, the operator removes a first storage device 44(0) from a respective slot of the initial storage processor enclosure 40(1) and installs the first storage device 44(0) in a respective slot of the new storage processor enclosure 40(2) (arrow 610). Next, the operator removes a second storage device 44(1) from a respective slot of the initial storage processor enclosure 40(1) and installs the second storage device 44(1) in a respective slot of the new storage processor enclosure 40(2), and so on.

It should be understood that, at any point in time, there is at most one storage devices 44 removed from the equipment 400, 500. Accordingly, since the equipment 400, 500 utilizes a data protection scheme (e.g., RAID5) that can withstand a storage device failure, any data stored in the storage device being transferred can be reconstructed if necessary. However, the transfer or each storage device 44 should be completed before that storage device 44 is considered to have failed (e.g., within a threshold amount of time).

Figure 8:
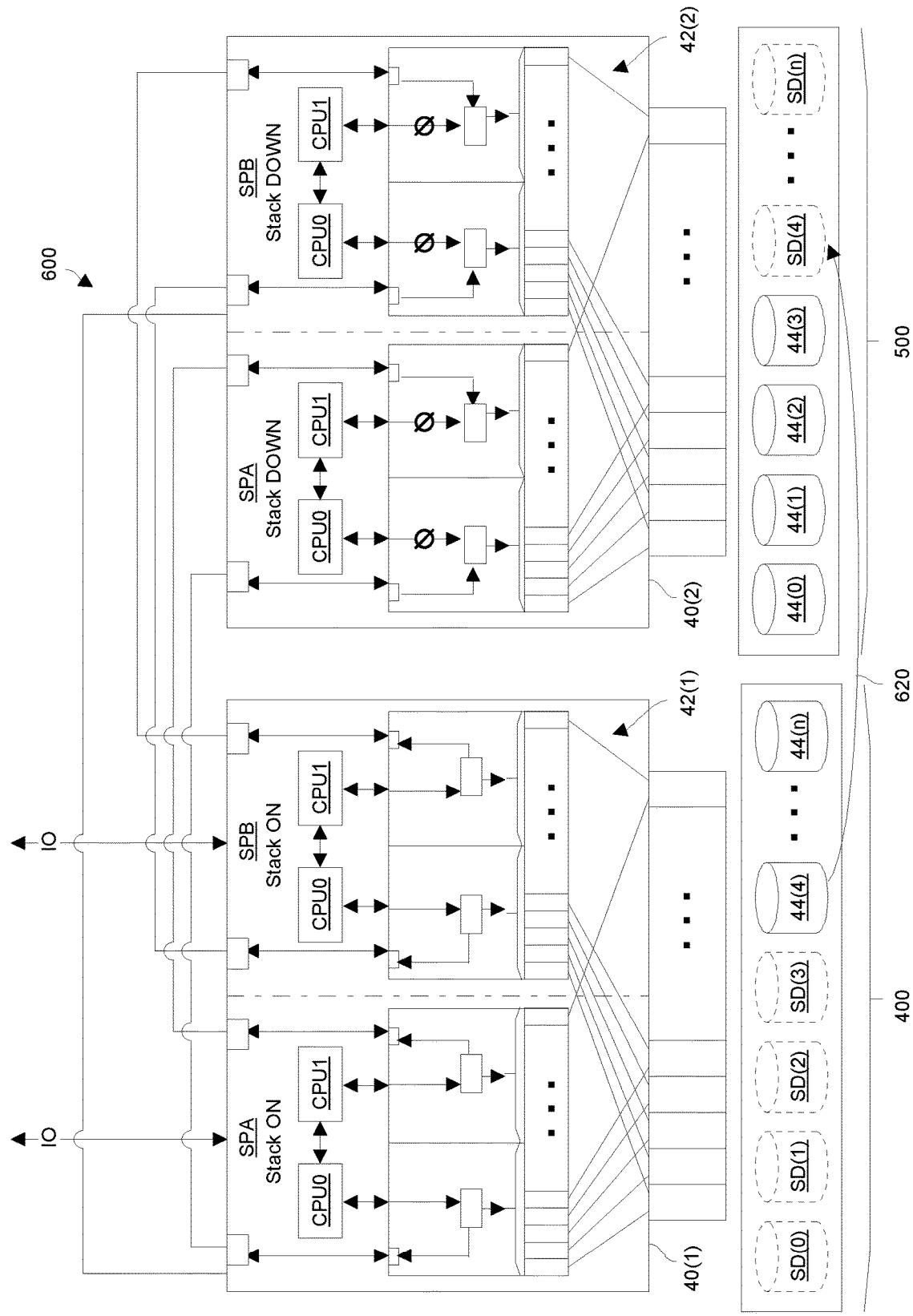
FIG. 8 is a block diagram illustrating additional details of the second upgrade example in accordance with certain embodiments.

In accordance with certain embodiments, the operator moves all of the system drives to the new storage processor enclosure 40(2) before moving the normal drives to the new storage processor enclosure 40(2). FIG. 8 shows the equipment 400, 500 with all system drives having been moved to the new enclosure 40(2) one by one (e.g., storage devices 44(0), . . . , 44(3)) and a regular drive 44(4) about to be moved to the new enclosure 40(2) (arrow 620). Accordingly, the slots SD(0), SD(3) of the initial enclosure 40(1) are now empty, and the slots SD(0), SD(3) of the new enclosure 40(2) are now populated with storage devices 44. Nevertheless, the SPs of the initial equipment 400 are able to robustly and reliably provide online access to the data store in the plurality of storage devices 44.

Figure 9:
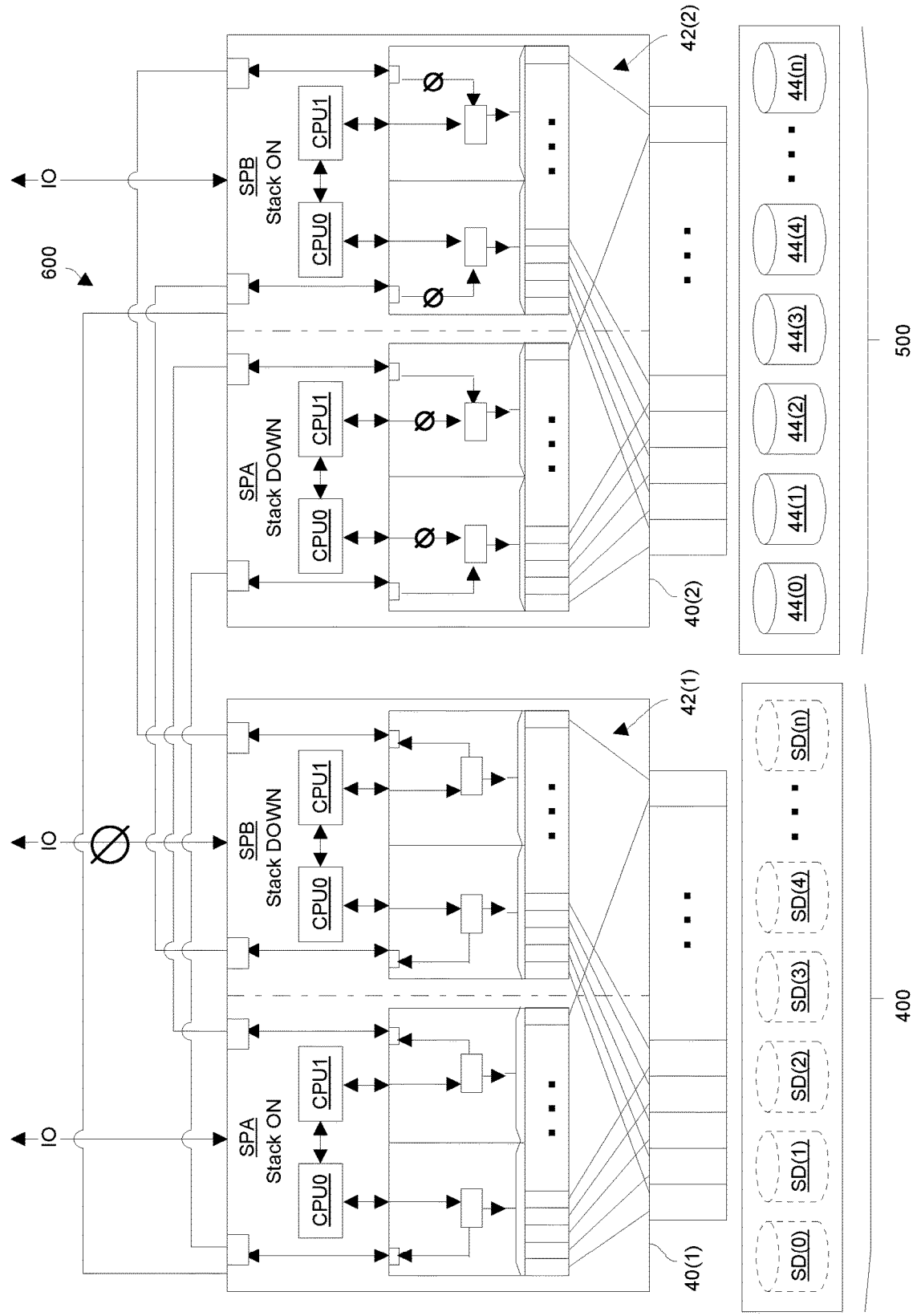
FIG. 9 is a block diagram illustrating further details of the second upgrade example in accordance with certain embodiments.

Physical transfer of the storage devices 44 continues one by one until all of the storage devices 44 have been moved from the initial storage processor enclosure 40(1) to the new storage processor enclosure 40(2). At that point and as shown in FIG. 9, all of the slots SD(0), . . . , SD(n) of the initial enclosure 40(1) are now empty, and all of the slots SD(0), . . . , SD(n) of the new enclosure 40(2) are now populated with storage devices 44.

At this point, the data storage equipment 400, 500 is adjusted so that data storage operations are performed by the storage processing circuitry 42(2) instead of the storage processing circuitry 42(1). To this end, the operator powers down the old SPB in the initial enclosure 40(1), and the IO paths fail over to the old SPA in the initial enclosure 40(1).

It should be understood that this upgrade process supports reuse of the initial IO modules (e.g., SLICs) or replaced of the initial IO modules with new IO modules. If the initial IO modules are to be used within the new enclosure 40(2), the operator physically moves the IO modules from the initial enclosure 40(1) to the new enclosure 40(2). If new IO modules are to be used within the new enclosure 40(2), the operator may direct SPB of the new data storage equipment 500 to perform IO remapping (e.g., to accommodate two enclosure generations that use different IO modules).

Additionally, at this time, the operator may perform other reconfiguration work. For example, the operator may transfer the network cable from the management LAN port of the initial data storage equipment 400 to the new data storage equipment 500. Additionally, the operator may configure the SPB of the new data storage equipment 500 with certain information (e.g., security keys, etc.) to enable the SPB of the new data storage equipment 500 to recognize the plurality of storage devices 44 and properly perform data encryption/decryption. Furthermore, the operator may change the attributes of the service ports of the new data storage equipment 500 from upstream to downstream, and may bind links between the upstream ports (i.e., the CPU root ports) the downstream ports leading to the storage devices 44.

With the new storage processing circuitry 40(2) now configured to provide online data storage operations on the plurality of storage devices 44, the new SPB stack is started (i.e., "stack ON"). Accordingly, the old SPA and the new SPB communicate with CMI over Ethernet and the new SPB takes all of the IO paths from the old SPB.

As shown in FIG. 9, the SPA of the initial data storage equipment 400 is "Stack ON", and the SPB of the initial data storage equipment 400 is "Stack DOWN". Additionally, the SPA of the new data storage equipment 500 is "Stack DOWN", and the SPB of the new data storage equipment 500 is "Stack ON". Accordingly, the SPA of the initial data storage equipment 400 and the SPB of the new data storage equipment 500 currently service IO requests.

Next, the SPA of the new data storage equipment 500 will be activated and the SPA of the initial data storage equipment 400 will be deactivated. To this end, the SPA of the initial data storage equipment 400 is powered down and IO paths and control paths fail over to the SPB of the new data storage equipment 500. After failover is complete, the SPA of the new data storage equipment 500 is made operational (i.e., "Stack ON") so that the SPA of the new data storage equipment 500 takes all of the IO paths that were on the old SPA of the initial data storage equipment 400.

Figure 10:
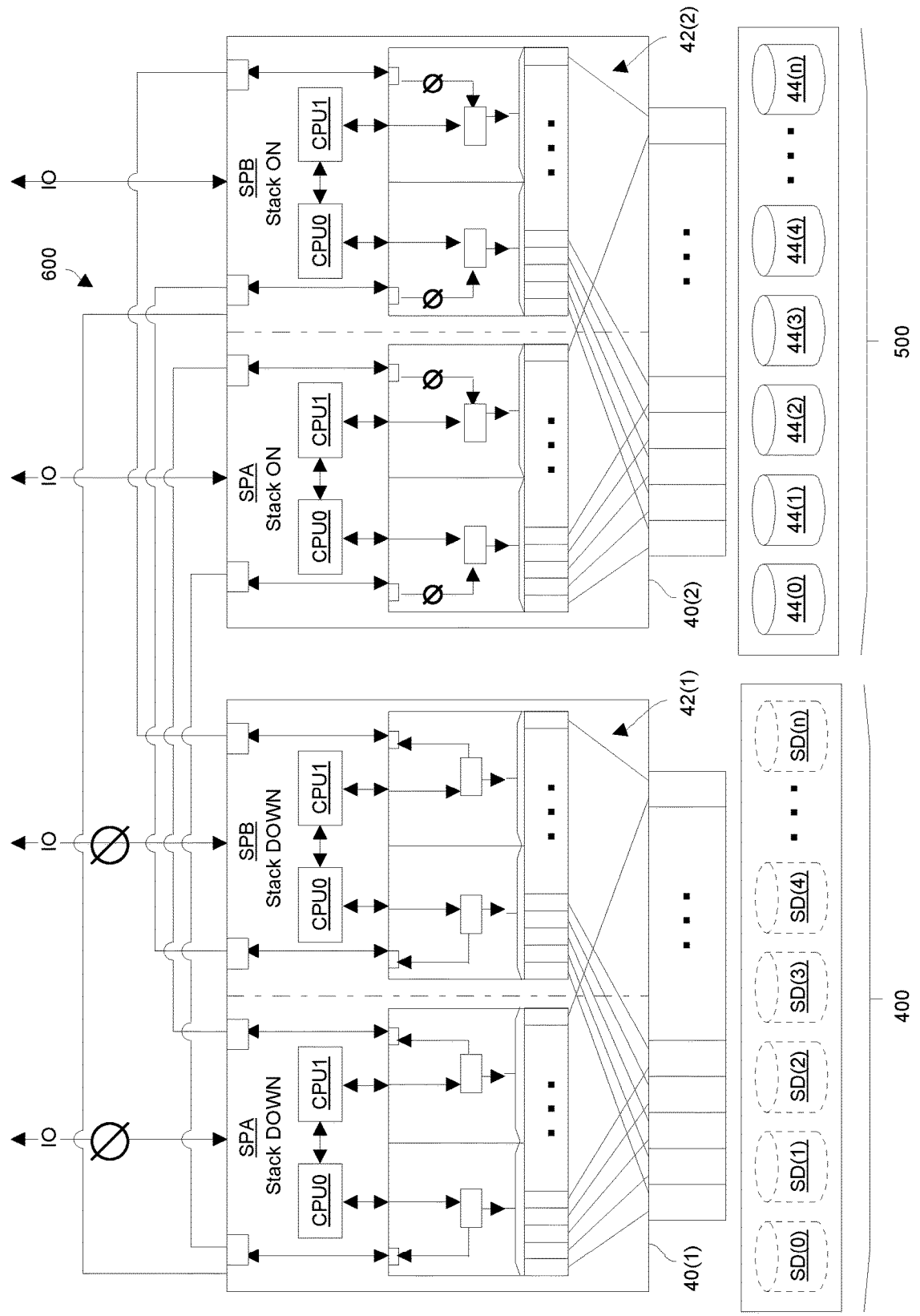
FIG. 10 is a block diagram illustrating more details of the second upgrade example in accordance with certain embodiments.

Additionally, write caching on the new data storage equipment 500 is enabled. Accordingly and as shown in FIG. 10, the new data storage equipment 500 is in full operation where all 10 paths and control paths are new on the new data storage equipment 500. Here, both SPs of the initial data storage equipment 400 may be powered down, and the set of cables 600 as well as the initial data storage equipment 400 may be removed. Further details will now be provided with reference to FIG. 11.

Figure 11:
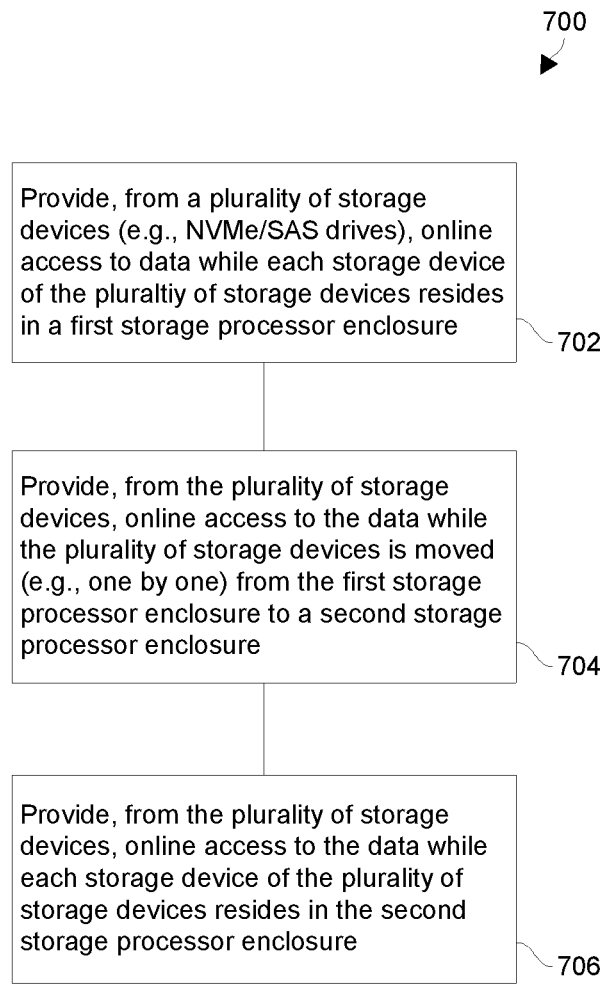
FIG. 11 is a flowchart of a procedure which is performed by specialized circuitry in accordance with certain embodiments.

FIG. 11 is a flowchart of a procedure 700 which is performed by specialized circuitry in accordance with certain embodiments. Such specialized circuitry maintains online access to data stored in a plurality of storage devices during a hardware upgrade. Such specialized circuitry may be formed by initial storage processing circuitry, new storage processing circuitry, and/or other storage processing circuitry (also see FIGS. 1 and 2).

At 702, the specialized circuitry provides, from the plurality of storage devices, online access to the data while each storage device of the plurality of storage devices resides in a first storage processor enclosure. Along these lines, the storage processing circuitry within the first storage processor enclosure may perform the data storage operations (e.g., also see FIGS. 3 and 7).

At 704, the specialized circuitry provides, from the plurality of storage devices, online access to the data while the plurality of storage devices is moved from the first storage processor enclosure to a second storage processor enclosure. Along these lines, the storage processing circuitry within the first storage processor enclosure and/or the second storage processor enclosure may perform the data storage operations (e.g., also see FIGS. 4, 8, and 9).

At 706, the specialized circuitry provides, from the plurality of storage devices, online access to the data while each storage device of the plurality of storage devices resides in the second storage processor enclosure. Along these lines, the storage processing circuitry within the second storage processor enclosure may perform the data storage operations (e.g., also see FIGS. 5 and 10).

Figure 12:
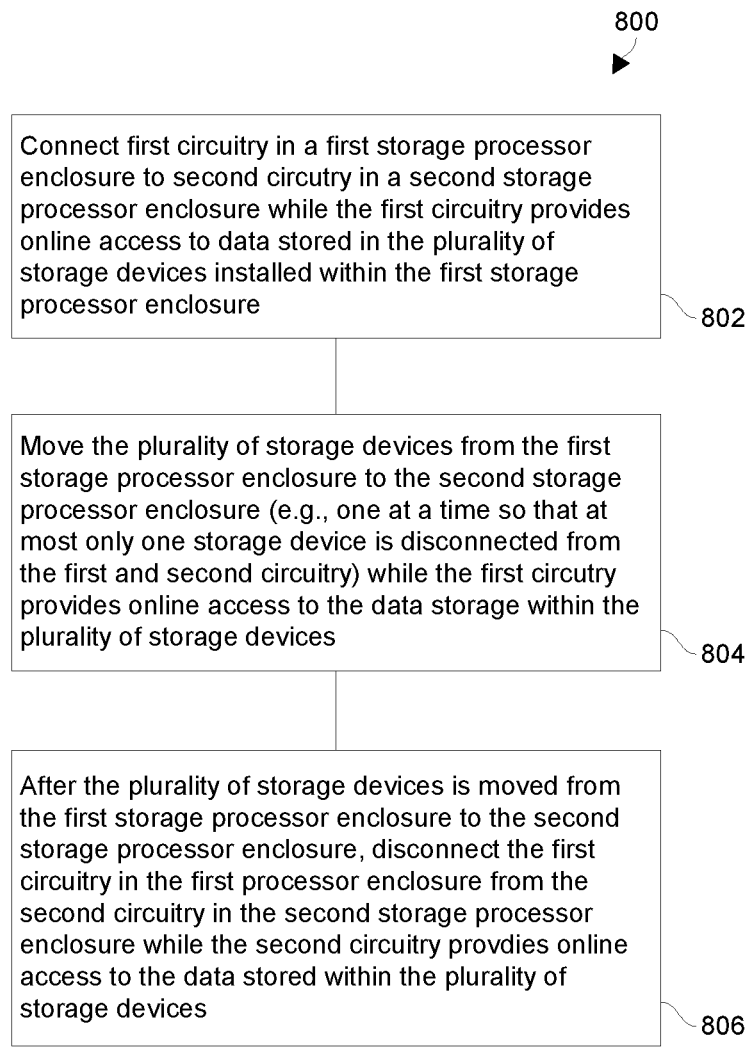
FIG. 12 is a flowchart of a procedure which is performed by an operator in accordance with certain embodiments.

FIG. 12 is a flowchart of a procedure 800 which is performed by an operator when upgrading data storage equipment in accordance with certain embodiments. During the upgrade, online access to data stored within a plurality of storage devices is maintained.

At 802, the operator connects first circuitry in a first storage processor enclosure to second circuitry in a second storage processor enclosure while the first circuitry provides online access to data stored within the plurality of storage devices installed within the first storage processor enclosure. Here, the first circuitry within the first storage processor enclosure performs the data storage operations (e.g., also see FIGS. 3 and 7).

At 804, the operator moves the plurality of storage devices from the first storage processor enclosure to the second storage processor enclosure while the first circuitry provides online access to the data stored within the plurality of storage devices. In accordance with some embodiments, the second circuitry of the second storage processor enclosure may also perform the data storage operations during storage device transfer (e.g., also see FIGS. 4 and 9). The operator eventually configures the second circuitry to perform the data storage operations instead of the first circuitry.

At 806, after the plurality of storage devices is moved from the first storage processor enclosure to the second storage processor enclosure, the operator disconnects the first circuitry in the first storage processor enclosure from the second circuitry of the second storage processor enclosure while the second circuitry provides online access to the data stored within the plurality of storage devices. Here, the second circuitry within the second storage processor enclosure performs the data storage operations (e.g., also see FIGS. 5 and 10).

It should be understood that other enclosures may be have been connected to the first storage processor enclosure and that such other enclosures may be connected to the second storage processor enclosure. Along these lines, there may be one or more disk array enclosures (DAEs) (e.g., containing SAS devices, NVMe devices, etc.). Connecting these DAEs to the second storage enclosure involves cable relocation from the first storage processor enclosure. For example, the DAEs may be attached from the backend I/O module ports, i.e. SAS controller I/O ports for SAS DAEs and HBA with PCI-E ports for NVMe DAEs, and so on.

As described above, improved techniques are directed to maintaining online access to data 32 stored in a plurality of storage devices 44 during a hardware upgrade in which the plurality of storage devices 44 is moved from an initial enclosure 40(1) to a new enclosure 40(2). The new enclosure 40(2) may have geometries and associated features that are significantly different from those of the initial enclosure 40(1) thus freeing the new enclosure 40(2) from constraints of the initial enclosure 40(2) such as physical restrictions, signaling restrictions, power restrictions, and so on. Moreover, such techniques support an online data-in-place upgrade (e.g., uninterrupted continuous access to data stored in the plurality of storage devices) thus alleviating the need to obtain new storage drives, copy the data, reconfigure external host computers, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as one or more host computers 22 and/or one or more other devices 28 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be appreciated that, when a new generation of data storage product is released in place of an old array, customers may want to upgrade in order to use a more powerful product with improved performance and/or capacity. Meanwhile, customers may also want continue to have online access to the same user data and configuration as that of the old array, and without disruption on data availability. For some conventional equipment, it may be difficult or even impossible to achieve this because storage processors for a new hardware generation may not work with the original enclosures for older hardware generations.

Accordingly, with conventional equipment, there may be no existing procedure to maintain online data in place across different hardware generations. Additionally, data migration or data replication may copy user data from an old array to a new array, but requires the new array to be equipped with same or more storage capacity above what customers already own. Furthermore, when switching to the new system, such switching is often met with some business downtime.

However, with certain improved techniques disclosed herein, there is no disruption to data access. Rather, data access remains available during the entire upgrade procedure.

Additionally, the procedure is much faster compared to data migration or data replication. In particular, no copying of user data from existing storage to new storage is required.

Furthermore, the upgrade is seamless. That is, the user configuration may be kept so no that there is no reconfiguration on customer system.

Also, there no requires on the new hardware. Rather, the new hardware may have a different midplane, form factor, capacity, operating characteristics, and so on.

As explained herein, certain improved techniques relate supporting online data in place for NVMe disk processor enclosures (DPE) through backend paths. In particular, such techniques involve connecting an old generation array with a new generation array through backend path, via PCIe cables, and then transferring backend drives and IO modules from the old array to the new array while keeping access to data available during the procedure.

Such a technique may have just a few requirements on hardware designation, CPU control and configuration of a backend switch via an I2C bus, and reservation of a backend service port to connect with another array. Accordingly, hardware designation may have maximum flexibility and chase trends of the storage industry.

It should be appreciated that some storage processors use a PCIe switch chip to support a full NVMe design, multi PCIe lanes and certain diagnostic functionality. Along these lines, some backend switches provide 25 PCIe ports used for support NVMe drives and, in this PCIe switch, there can be bounding/unbounding of the ports between logical ports and physical ports through i2c bus. Port attributes may be changed as well such as changing a port from a downstream ports to an upstream port, and vice versa.

In accordance with certain embodiments for the online data in place upgrade process, it is made sure that the drives are always persistent in the storage stack (always can be seen from the stack), and the IO is always being serviced without DU/DL. Accordingly, in some techniques, it is desirable to
1. change the attribute in the PCIe service port in a new SPA from being downstream port to being an upstream port,
2. unbind the link between the upstream port linking the CPU root port and all the NVMe downstream ports, and
3. re-bind the PCIe service port with all the NVMe downstream ports.

In some embodiments, this change may only happen on a new SPA and a new SPB and, after this change the local CPUs on the new SPs should not see the downstream ports as well as the NVMe drives. Meanwhile, the remote CPU in the old SP can always see the NVMe drives in the new DPE even after they are moved from the old DPE to the new DPE. For such process, the old SP can see two DPEs in the time frame before storage stacks are started on new SPs, so a virtual DPE enclosure object may need to be created in old SPs to help temporarily manage the new DPE.

For a high availability system, especially for inter-SP communication may be accomplished using CMI over Ethernet. Such communication provides sufficient bandwidth for rich and reliable communication between the SPs of the new DPE and the old DPE.

In accordance with certain embodiments, an improved method supports backend online DIP via backend PCIe and/or via the SAS protocol. Certain details in the figures may be adjusted for particular implementations. For the PCIe backend, PCIe switches change the pathways to meet the access capability across SPs. For SAS, a SAS controller may be used between the CPU and a SAS expander to handle the protocol transactions.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

For example, in some embodiments, more than one storage device 44 may be transferred at a time as long as RAID protection scheme is not violated. Ideally, such transfer should be not trigger the storage processing circuitry to rebuild a storage device 44 in transit. Such modifications and enhancements are intended to belong to various embodiments of the disclosure.

What is claimed is:

1. A method of maintaining online access to data stored in a plurality of storage devices during a hardware upgrade, the method comprising:
   providing, from the plurality of storage devices, online access to the data while each storage device of the plurality of storage devices resides in a first storage processor enclosure;
   providing, from the plurality of storage devices, online access to the data while the plurality of storage devices is moved from the first storage processor enclosure to a second storage processor enclosure; and
   providing, from the plurality of storage devices, online access to the data while each storage device of the plurality of storage devices resides in the second storage processor enclosure;
   wherein providing online access to the data while the plurality of storage devices is moved from the first storage processor enclosure to the second storage processor enclosure includes:
      within a predefined storage device failure time limit, losing communication with a particular storage device of the plurality of storage devices when the particular storage device is removed from the first storage processor enclosure and regaining communication with the particular storage device when the particular storage device is installed into the second storage processor enclosure to prevent initiation of a rebuild procedure configured to rebuild the particular storage device.

2. A method as in claim 1 wherein first storage processing circuitry resides in the first storage processor enclosure and second storage processing circuitry resides in the second storage processor enclosure; and
   wherein the method further comprises:
      while each storage device of the plurality of storage devices resides in the first storage processor enclosure and while the first storage processing circuitry performs data storage operations accessing the data stored in the plurality of storage devices, establishing a data pathway between the first storage processing circuitry and the second storage processing circuitry.

3. A method as in claim 2 wherein providing online access to the data while the plurality of storage devices is moved from the first storage processor enclosure to the second storage processor enclosure includes:
   performing data storage operations accessing the data stored in the plurality of storage devices using the data pathway established between the first storage processing circuitry and the second storage processing circuitry while each storage device of the plurality of storage devices is transferred one at a time from a respective physical storage device slot of the first enclosure to a respective physical storage device slot of the second enclosure.

4. A method as in claim 3 wherein performing the data storage operations using the data pathway includes:
   from the first storage processing circuitry and in response to a set of host input/output (I/O) requests from a set of host computers, accessing (i) a first set of storage devices of the plurality of storage devices currently in the first storage processor enclosure and (ii) a second set of storage devices of the plurality of storage devices currently in the second storage processor enclosure through the data pathway.

5. A method as in claim 4 wherein performing the data storage operations using the data pathway further includes:

from the second storage processing circuitry and in response to another set of host I/O requests from the set of host computers, accessing (i) the first set of storage devices currently in the first storage processor enclosure through the data pathway and (ii) the second set of storage devices currently in the second storage processor enclosure.

6. A method as in claim 2 wherein the first storage processing circuitry includes a first central processing unit (CPU) and a first backend switch;
wherein the second storage processing circuitry includes a second CPU and a second backend switch;
wherein a set of bus expansion cables extends between a service port of the first backend switch and a service port of the second backend switch; and
wherein establishing the data pathway between the first storage processing circuitry and the second storage processing circuitry includes:
configuring the service port of the first backend switch as a downstream port that faces away from the first CPU from a perspective of the first backend switch and configuring the service port of the second backend switch as an upstream port that faces the first CPU from a perspective of the second backend switch.

7. A method as in claim 6 wherein the second backend switch further includes a root port that connects to the second CPU and slot ports that connect to physical slots of the second storage processor enclosure; and
wherein establishing the data pathway between the first storage processing circuitry and the second storage processing circuitry further includes:
unbinding a set of logical links that currently link the root port of the second backend switch to the slot ports of the second backend switch, and
binding a new set of logical links that newly link the service port of the second backend switch with the slot ports of the second backend switch.

8. A method as in claim 2 wherein the first storage processing circuitry includes first enclosure storage processors;
wherein the second storage processing circuitry includes second enclosure storage processors; and
wherein the method further comprises:
disabling cache mirroring between the first enclosure storage processors and, after cache mirroring between the first enclosure storage processors is disabled, performing cache mirroring between a particular storage processor of the first enclosure storage processors and a particular storage processor of the second enclosure storage processors.

9. A method as in claim 8 wherein a set of Ethernet cables extends between a local area network (LAN) port of the first storage processing circuitry and a LAN port of the second storage processing circuitry; and
wherein performing cache mirroring between the particular storage processor of the first enclosure storage processors and the particular storage processor of the second enclosure storage processors includes:
synchronizing a cache of the first storage processing circuitry with a cache of the second storage processing circuitry through the set of Ethernet cables.

10. A method as in claim 9, further comprising:
after the plurality of storage devices is moved from the first storage processor enclosure to the second storage processor enclosure, disabling cache mirroring between the particular storage processor of the first enclosure storage processors and the particular storage processor of the second enclosure storage processors and then performing cache mirroring between the second enclosure storage processors.

11. A method as in claim 2 wherein the plurality of storage devices includes a set of system drives and a set of regular drives; and
wherein providing online access to the data while the plurality of storage devices is moved from the first storage processor enclosure to the second storage processor enclosure includes:
performing data storage operations accessing the data stored in the plurality of storage devices in response to host input/output (I/O) requests from a set of host computers while the set of system drives is transferred one by one from the first storage processor enclosure to the second storage processor enclosure and subsequently the set of regular drives is transferred one by one from the first storage processor enclosure to the second storage processor enclosure.

12. A method as in claim 2 wherein providing online access to the data while the plurality of storage devices is moved from the first storage processor enclosure to the second storage processor enclosure includes:
in response to host input/output (I/O) requests from a set of host computers, operating storage processors of the first storage processing circuitry until all storage devices of the plurality of storage devices are moved from the first storage processor enclosure to the second storage processor enclosure.

13. A method as in claim 2 wherein providing online access to the data while the plurality of storage devices is moved from the first storage processor enclosure to the second storage processor enclosure includes:
in response to host input/output (I/O) requests from a set of host computers, concurrently operating a storage processor of the first storage processing circuitry and a storage processor of the second storage processing circuitry until all storage devices of the plurality of storage devices are moved from the first storage processor enclosure to the second storage processor enclosure.

14. A method as in claim 1 wherein online access to the data stored in the plurality of storage devices is provided continuously during the method to enable a set of host computers to have uninterrupted online access to data-in-place within the plurality of storage devices.

15. A method as in claim 1 wherein each of the first storage processor enclosure and the second storage processor enclosure configure Peripheral Component Interconnect Express (PCIe) switching circuitry to form storage paths between the first storage processor enclosure and the second storage processor enclosure.

16. A method as in claim 1 wherein each of the first storage processor enclosure and the second storage processor enclosure apply the Serial Attached SCSI (SAS) protocol to complete data storage operations between the first storage processor enclosure and the second storage processor enclosure.

17. A method as in claim 1, further comprising:
initiating measurement of storage device timeout period in response to losing communication with the particular storage device when the particular storage device is removed from the first storage processor enclosure, the rebuild procedure being configured to begin rebuilding the particular storage device if the measured storage device timeout period exceeds a predefined rebuild threshold time.

18. Data storage equipment, comprising:
a first storage processor enclosure;
a second storage processor enclosure; and
electronic circuitry coupled with the first storage processor enclosure and the second storage processor enclosure, the electronic circuitry including memory and control circuitry coupled with the memory, the memory storing instructions which, when carried out by the control circuitry, causing the control circuitry to perform a method of:
 providing, to a set of external host computers, access to data stored in a plurality of storage devices while each storage device of the plurality of storage devices resides in the first storage processor enclosure,
 providing, to the set of external host computers, access to the data stored in the plurality of storage devices while the plurality of storage devices is moved from the first storage processor enclosure to the second storage processor enclosure, and
 providing, to the set of external host computers, access to the data stored in the plurality of storage devices while each storage device of the plurality of storage devices resides in the second storage processor enclosure;
wherein providing access to the data while the plurality of storage devices is moved from the first storage processor enclosure to the second storage processor enclosure includes:
 within a predefined storage device failure time limit, losing communication with a particular storage device of the plurality of storage devices when the particular storage device is removed from the first storage processor enclosure and regaining communication with the particular storage device when the particular storage device is installed into the second storage processor enclosure to prevent initiation of a rebuild procedure configured to rebuild the particular storage device.

19. A method of upgrading data storage equipment, the method comprising:
connecting first circuitry in a first storage processor enclosure to second circuitry in a second storage processor enclosure while the first circuitry provides online access to data stored within a plurality of storage devices installed within the first storage processor enclosure;
moving the plurality of storage devices from the first storage processor enclosure to the second storage processor enclosure while the first circuitry provides online access to the data stored within the plurality of storage devices; and
after the plurality of storage devices is moved from the first storage processor enclosure to the second storage processor enclosure, disconnecting the first circuitry in the first storage processor enclosure from the second circuitry in the second storage processor enclosure while the second circuitry provides online access to the data stored within the plurality of storage devices;
wherein moving the plurality of storage devices from the first storage processor enclosure to the second storage processor enclosure includes:
 within a predefined storage device failure time limit, losing communication with a particular storage device of the plurality of storage devices when the particular storage device is removed from the first storage processor enclosure and regaining communication with the particular storage device when the particular storage device is installed into the second storage processor enclosure to prevent initiation of a rebuild procedure configured to rebuild the particular storage device.

20. A method as in claim 19 wherein moving the plurality of storage devices includes:
transferring each storage device of the plurality of storage devices one at a time from the first storage processor enclosure to the second storage processor enclosure such that at most one storage device of the plurality of storage devices is uninstalled while moving the plurality of storage devices from the first storage processor enclosure to the second storage processor enclosure.

21. A method as in claim 20 wherein transferring each storage device of the plurality of storage devices one at a time includes:
moving each storage device of the plurality of storage devices one by one from a respective physical slot of the first storage processor enclosure to a respective physical slot of the second storage processor enclosure while, to a set of host computers, the first circuitry provides online access to the data stored within the plurality of storage devices and the second circuitry does not provide online access to the data stored within the plurality of storage devices.

22. A method as in claim 20 wherein transferring each storage device of the plurality of storage devices one at a time includes:
moving each storage device of the plurality of storage devices one by one from a respective physical slot of the first storage processor enclosure to a respective physical slot of the second storage processor enclosure while, to a set of host computers, both the first circuitry and the second circuitry provide online access to the data stored within the plurality of storage devices.

23. A method as in claim 17, further comprising:
halting measurement of the storage device timeout period in response to regaining communication with the particular storage device when the particular storage device is installed into the second storage processor enclosure, the measured storage device timeout period being less than the predefined rebuild threshold time when measurement of the storage device timeout period is halted.

* * * * *